US008400482B2

(12) United States Patent
Okuno et al.

(10) Patent No.: US 8,400,482 B2
(45) Date of Patent: Mar. 19, 2013

(54) IMAGE HOLD BODY AND IMAGE FORMING APPARATUS

(75) Inventors: Tatsuo Okuno, Kanagawa (JP); Kenji Ogi, Tokyo (JP); Akemi Murakami, Kanagawa (JP); Akihiko Noda, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 268 days.

(21) Appl. No.: 12/869,059

(22) Filed: Aug. 26, 2010

(65) Prior Publication Data

US 2011/0169905 A1 Jul. 14, 2011

(30) Foreign Application Priority Data

Jan. 13, 2010 (JP) ................................ 2010-004788

(51) Int. Cl.
*B41J 2/39* (2006.01)
*B41J 2/395* (2006.01)
*B41J 2/41* (2006.01)
*G11B 3/00* (2006.01)

(52) U.S. Cl. ........................................ 347/141; 347/112

(58) Field of Classification Search .................. 347/112, 347/141

See application file for complete search history.

(56) References Cited

U.S. PATENT DOCUMENTS 5,640,189 A 6/1997 Ohno et al.
6,760,051 B2 * 7/2004 Fujii et al. ..................... 347/141
7,292,231 B2 * 11/2007 Kodama et al. ............... 345/173
2002/0126195 A1 9/2002 Fujii et al.
2005/0259140 A1 11/2005 Kim et al.
2006/0210339 A1 * 9/2006 Shimoda et al. ................ 400/76
2008/0024584 A1 * 1/2008 Lawton et al. ................ 347/112

FOREIGN PATENT DOCUMENTS

JP B2-3233463 11/2001
JP A-2003-32440 1/2003
JP A-2004-219635 8/2004
JP A-2005-331955 12/2005
JP B2-3826013 9/2006

* cited by examiner

*Primary Examiner* — Stephen Meier
*Assistant Examiner* — Tracey McMillion
(74) *Attorney, Agent, or Firm* — Oliff & Berridge. PLC

(57) ABSTRACT

An image hold body includes a support body, a plurality of pixel electrodes, charge storage members, switch members, scanning lines, signal lines and shield members. A latent image voltage is applied to the plurality of pixel electrodes based on an image signal. The charge storage members store charge corresponding to the latent image voltage. The scanning lines select and scan pixel electrode groups through the switch members. The signal lines apply the latent image voltage through the switch members to the pixel electrodes of each of the pixel electrode groups selected by the scanning lines. The shield members are provided on the support body corresponding to the signal lines placed in the proximity of the pixel electrodes, and shield an effect of at least a part of an electric field from the signal line on an electric field based on the latent image voltage of the pixel electrodes.

7 Claims, 20 Drawing Sheets

IMAGE HOLD BODY AND IMAGE FORMING APPARATUS

CROSS-REFERENCE TO RELATED APPLICATION

This application is based on and claims priority under 35 USC119 from Japanese Patent Application No. 2010-004788 filed on Jan. 13, 2010.

BACKGROUND

1. Technical Field

This invention relates to an image hold body and an image forming apparatus using the image hold body.

2. Related Art

Electrophotography is used as an image forming system used with an image forming apparatus of a copier, a printer, etc. A light image is applied to a photoconductive body charged by a charger of a corona discharger, a charging roll, etc., using a laser or an LED array to form an electrostatic latent image and the formed electrostatic latent image is developed using charged toner and an is visualized.

In contrast, an image forming apparatus of a system for forming an electrostatic latent image without using a photoconductive body is already proposed.

SUMMARY

According to an aspect of the invention, an image hold body includes a movable support body, a plurality of pixel electrodes, charge storage members, switch members, scanning lines, signal lines and shield members. The plurality of pixel electrodes is provided on the support body, and is arranged like a matrix in pixel units along a moving direction of the support body and a crossing direction crossing the move direction. A latent image voltage is applied to the plurality of pixel electrodes based on an image signal. The charge storage members are provided on the support body in a one-to-one correspondence with the pixel electrodes and store charge corresponding to the latent image voltage applied to the pixel electrodes. The switch members are provided on the support body in a one-to-one correspondence with the pixel electrodes and switch a timing of applying the latent image voltage to the pixel electrodes. The scanning lines are provided on the support body, and select and scan a plurality of pixel electrode groups to be scanned through the switch members. The plurality of pixel electrode groups is arranged in the crossing direction of the support body. The signal lines are provided on the support body and apply the latent image voltage based on the image signal through the switch members to the pixel electrodes of each of the pixel electrode groups selected by the scanning lines in the pixel electrode groups arranged in the move direction of the support body. The shield members are provided on the support body corresponding to the signal lines placed in the proximity of the pixel electrodes and shield an effect of at least a part of an electric field from the signal line on an electric field based on the latent image voltage of the pixel electrodes.

BRIEF DESCRIPTION OF THE DRAWINGS

Exemplary embodiments of the invention will be described in detail based on the following figures, wherein:

FIG. 1A is a perspective view of the image hold body; FIG. 1B shows the pixel electrode periphery configuration, and FIG. 1C shows a main part cross section viewed from B direction in FIG. 1B;

DETAILED DESCRIPTION

Figure 1A:
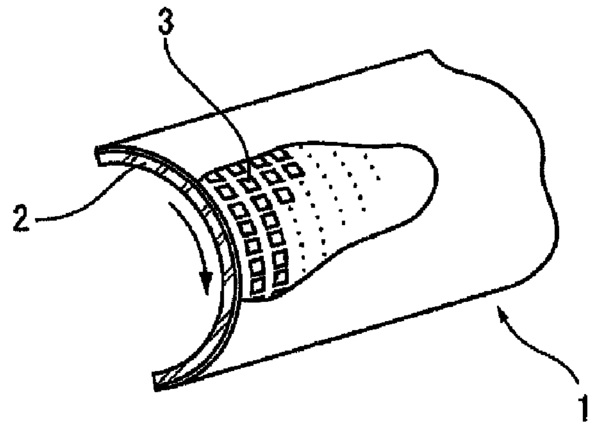
FIGS. 1A to 1C are schematic representations to show an outline of an embodiment of an image hold body incorporating the invention.
Figure 1B:
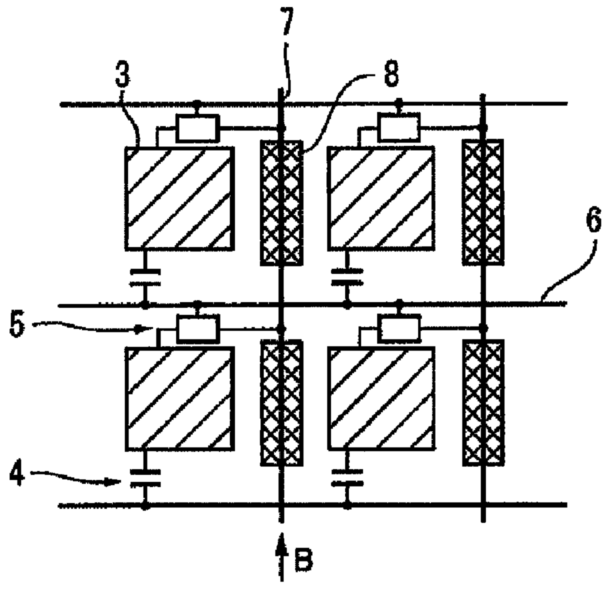
Figure 1C:
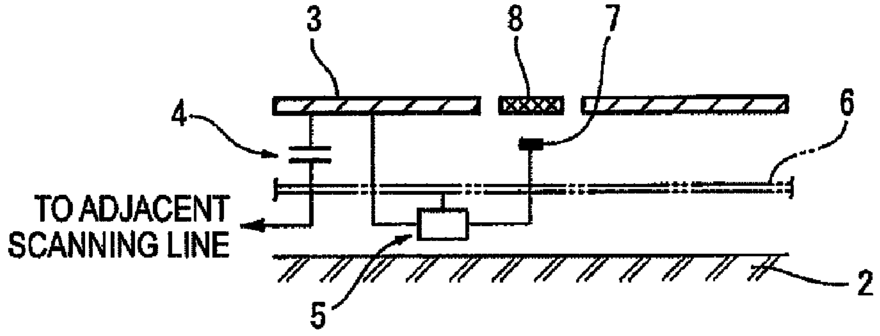

FIG. 1A is a schematic representation to show an outline of an embodiment of an image hold body incorporating the invention, FIG. 1B shows the pixel electrode periphery configuration of the image hold body, and FIG. 1C shows a main part cross section viewed from B direction in FIG. 1B.

In FIG. 1, an image hold body includes a movable support body 2, a plurality of pixel electrodes 3 provided on the support body 2 and arranged like a matrix in pixel units along the move direction of the support body 2 and the crossing direction crossing the move direction, to which a latent image voltage based on an image signal is applied, charge storage members 4 provided on the support body 2 in a one-to-one correspondence with the pixel electrodes 3 for storing charge corresponding to the latent image voltage applied to the pixel electrodes 3, switch members 5 provided on the support body 2 in a one-to-one correspondence with the pixel electrodes 3 for switching the timing of applying the latent image voltage to the pixel electrodes 3, scanning lines 6 provided on the support body 2 for selecting and scanning a plurality of pixel electrode groups to be scanned, arranged in the direction crossing the move direction of the support body 2 through the switch members 5, signal lines 7 provided on the support body 2 for applying the latent image voltage based on the image signal through the switch members 5 to the pixel electrodes 3 of each of the pixel electrode groups selected by the scanning lines 6 in the pixel electrode groups arranged in the move direction of the support body 2, and shield members 8 provided on the support body 2 corresponding to the signal lines 7 placed in the proximity of the pixel electrodes 3 for shielding the effect of at least a part of an electric field from the signal line 7 on an electric field based on the latent image voltage of the pixel electrodes 3.

The support body may be a movable body and may be shaped like a plate, like a drum, like a belt, etc.; preferably it is shaped like a drum to simplify the configuration.

The pixel electrodes may be arranged like a matrix in the move direction of the support body 2 and the crossing direction crossing the move direction and the arrangement density corresponds to the formable pixel density.

Further, as the charge storage member 4, a member including a capacitance element is named representatively, but the charge storage member may include no capacitance element and, for example, may use junction capacitance of another element, stray capacitance of the pixel electrode 3, etc., in which case the charge storage effect for a short time is produced.

Further, as the switch member 5, a thin film transistor (TFT) is named representatively, but any other element may be used if it can switch the applying timing of latent image voltage applied to the pixel electrode 3.

The shield member 8 may cover a part of the signal line 7 and electrically shield the field action for the pixel electrode 3 from the part. Thus, the shield member 8 may be formed of a member capable of shielding an electromagnetic wave from a signal transmitted to the signal line 7 by electrostatic shielding or electromagnetic shielding, for example. A conductive thin layer is used representatively. At this time, "shield" does not mean complete eliminating of the effect and means shield to such an extent that an image using the pixel electrodes 3 is not affected.

The shield member 8 need not necessarily be brought into electric contact with any other member; however, preferably a predetermined voltage is applied to the shield member 8 to suppress the effect on the pixel electrodes 3 for a change in a signal transmitted to the signal line 7. According to this, if a signal change in the signal line 7 occurs, the part covered with the shield member 8 becomes a stable potential and the effect given to the pixel electrodes 3 is made uniform. Particularly, as such a predetermined voltage, preferably, latent image voltage corresponding to a non-image part of an image formed in the pixel electrodes 3 is applied. Alternatively, preferably the shield member 8 is electrically connected to the nearest one pixel electrode 3. According to this, the shield member 8 becomes an equal potential to the pixel electrode 3 and the effect from the signal line is lightened. The "electric connection" means a connection state in which they are electrically short-circuited and can be set to the same potential.

The shield member 8 may cover at least a part of the signal line 7 placed in the proximity of the adjacent pixel electrode 3 and may be provided to the part exceeding the line width for the signal line 7 in the part. In this case, the field action of the part shielded by the shield member 8 is lightened. To increase the shield effect of the shield member 8, preferably the shield member 8 is provided to the part largely exceeding the line width for the signal line 7. Further, from the viewpoint of more effectively shielding the field action from the signal line 7, preferably the shield member 8 is provided so as to cover all the signal line 7 positioned between the pixel electrodes 3.

On the other hand, from the viewpoint of lightening the effect of the field action from the scanning line 6, preferably the shield member 8 shields the effect of at least a part of the electric field from the scanning line 6 on the electric field based on the latent image voltage of the pixel electrode 3. According to this, the field action from the scanning line 6 in addition to the signal line 7 is also lightened. Further, if the scanning line 6 positioned between the pixel electrodes 3 is all covered, the effect of the field action from the scanning line 6 is still more lightened.

Preferably, the shield member 8 is placed at a deeper position than the pixel electrode 3 relative to the thickness direction of the pixel electrode 3 on the support body 2. In this case, the area of the pixel electrode 3 occupying the support body 2 is set large and design flexibility of higher density, etc., increases. Further, from the viewpoint of lightening the field action from the signal line 7 and the scanning line 6, when the pixel electrode 3 is projected in the thickness direction of the pixel electrode 3, preferably the shield member 8 has a portion overlapping a part of the pixel electrode 3. Thus, the overlap portion of the shield member 8 and the pixel electrode 3 is provided, whereby at least a leakage field from the signal line 7 still more lessens. In this case, preferably the shield member 8 has a portion overlapping a part of each between the adjacent pixel electrodes 3 from the point of shielding the field action.

An image forming apparatus incorporating the image hold body 1 may be as follows:

The image forming apparatus may include the image hold body 1, latent image write means for writing a latent image based on an image signal to the pixel electrodes 3 of the image hold body 1, and developing means for developing the latent image written by the latent image write means in a developer.

Further, from the viewpoint of still more suppressing the effect of the field action from the signal line 7 in such an image forming apparatus, preferably a latent image voltage responsive to a non-image part of a latent image formed by the pixel electrodes 3 of the image hold body 1 is applied to the shield member 8 in a mode in which electric connection of the shield member 8 and the pixel electrode 3 is not made.

Figure 2:
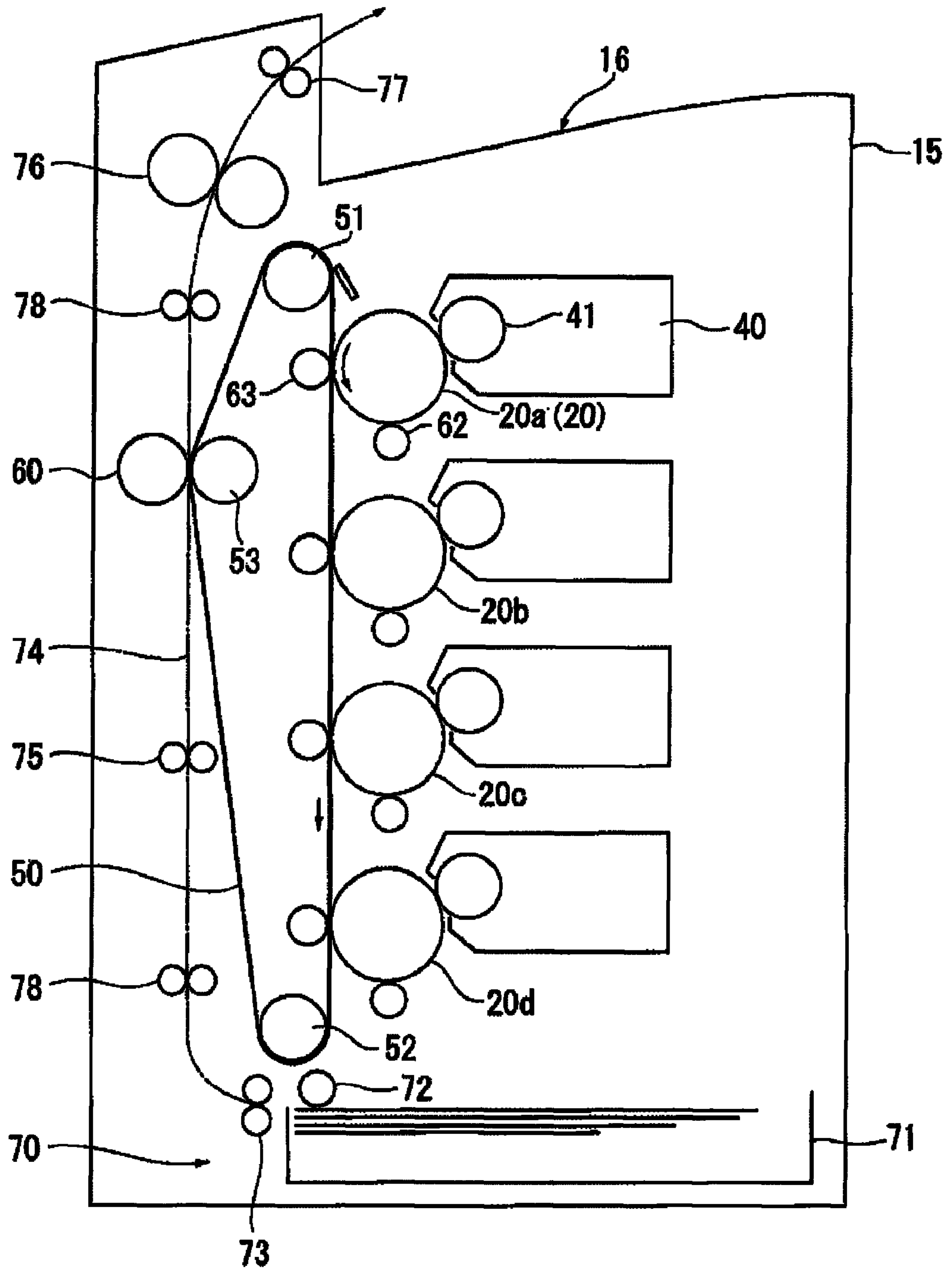
FIG. 2 is a schematic representation to show the general configuration of an image forming apparatus according to Embodiment 1 of the invention.

The invention will be discussed below in more detail based on embodiments shown in the accompanying drawings:

FIG. 2 shows Embodiment 1 of an image forming apparatus incorporating the invention.

In the figure, the image forming apparatus of the embodiment is a tandem color image forming apparatus. In an apparatus cabinet 15, image hold bodies 20 (20*a* to 20*d*) where color toner images of color components (for example, yellow, magenta, cyan, and black) are formed by electrophotography, for example, are placed in parallel roughly in a vertical direction, a circulating intermediate transfer belt 50 is stretched roughly in the vertical direction opposed to the image hold bodies 20, and the color toner images on the image hold bodies 20 are put on the intermediate transfer belt 50.

In the embodiment, each of the image hold bodies 20 is surrounded by a developing device 40 for developing an electrostatic latent image formed on the image hold body 20 in toner to provide a visible image and a cleaner 62 for cleaning remaining toner on the image hold body 20. A transfer device 63 for transferring the developed toner image on the image hold body 20 onto the intermediate transfer belt 50 is provided at a position opposed to the image hold body 20 across the intermediate transfer belt 50. Numeral 41 denotes a developing roll for directly supplying toner to the image hold body 20 in the developing device 40.

On the other hand, the intermediate transfer belt 50 is stretched on a plurality of stretch rolls 51 to 53 (in the example, three) and circulates with the stretch roll 51 as a drive roll, for example. A secondary transfer device 60 is provided at a position opposed to the stretch roll 53 across the intermediate transfer belt 50. Multiple toner images put on the intermediate transfer belt 50 are collectively transferred to a record material supplied from a record material supply device 70 described later. At this time, the secondary transfer device 60 is opposed to the stretch roll 53 and a predetermined secondary transfer bias is applied to space therebetween.

The record material supply device 70 for supplying a record material is provided in a lower part in the apparatus cabinet 15. For example, a record material stored in a supply vessel 71 is supplied one sheet at a time in a supply roll 72 and a separation mechanism 73 toward a record material conveying passage 74 extending in the vertical direction.

The record material supplied from the record material supply device 70 to the record material conveying passage 74 is once registered on a registration roll 75 provided downstream of the record material conveying passage 74 and then is conveyed toward the downstream secondary transfer device 60 at a predetermined timing. Then, the multiple toner images on the intermediate transfer belt 50 are collectively transferred to a record material in a secondary transfer part of the secondary transfer device 60. The record material to which the toner images are collectively transferred is fixed in a fixing device 76 and then is discharged from a discharge roll 77 to a record material discharge receptacle 16 formed of a part of the apparatus cabinet 15. Transfer members (for example, conveying rolls, etc.,) 78 for conveying a record material are provided in the record material conveying passage 74 where appropriate.

Next, the image hold body 20 used with the embodiment will be discussed in detail.

Figure 3:
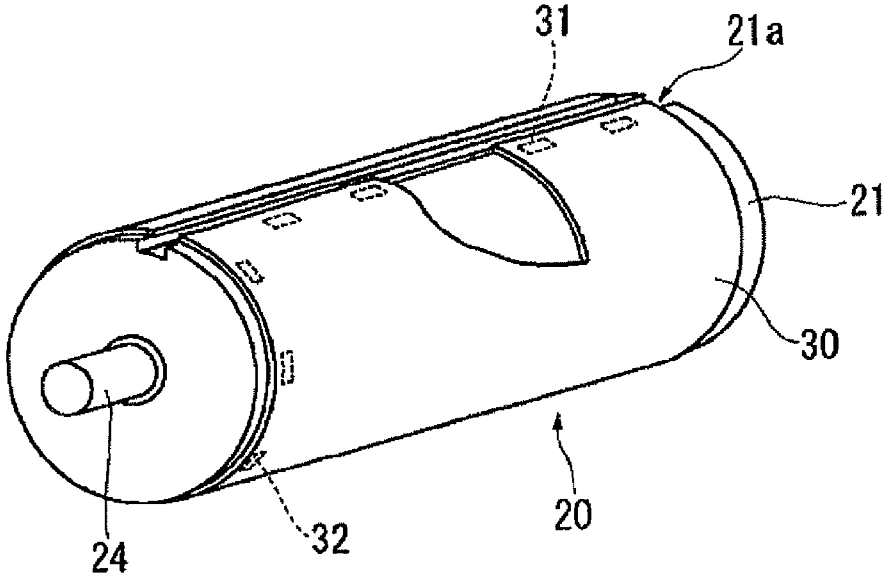
FIG. 3 is a perspective schematic representation to show the image hold body used in Embodiment 1 of the invention.

As shown in FIG. 3, as the image hold body 20 of the embodiment, a matrix panel 30 having a large number of pixel electrodes (described later) formed like a matrix on a film base material is wound around a rigid body drum 21 of a rotatable support body and is fixed and supported.

As the matrix panel 30, for example, various elements are manufactured for a heat-resistant polyimide resin film base material (not shown) using a thin film technique used with an IC manufacturing process, etc., and further pixel electrodes 34 (for example, see FIG. 5) are arranged as a matrix. As the pixel electrodes 34 thus arranged as a matrix, for example, the direction along the rotation shaft direction of the rigid body drum 21 is a data line and the direction along the rotation direction of the rigid body drum 21 is a scanning line. Thus, the data line and the scanning line of the matrix panel 30 are provided with an appropriate number of data drivers 31 and scanning drivers 32 connected to each pixel electrode 34. Input lines to the drivers 31 and 32 are further collected to a smaller number of lines and the lines are wired to the inner face side of the rigid body drum 21 through the matrix panel 30.

A protective film (not shown) for ensuring the insulating properties of the pixel electrodes 34, etc., and protecting the surfaces of the pixel electrodes 34 and peripheral elements is provided the on the surface side of the matrix panel 30.

Figure 4A:
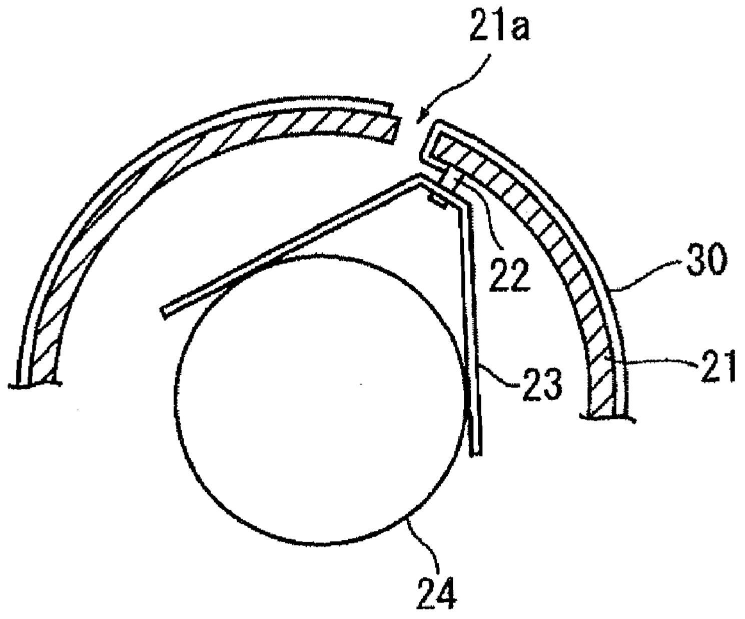
FIG. 4A is a schematic representation to show a feed structure example of the image hold body used in Embodiment 1 of the invention and FIG. 4B is a schematic representation to show a configuration example of a slip spring.
Figure 4B:
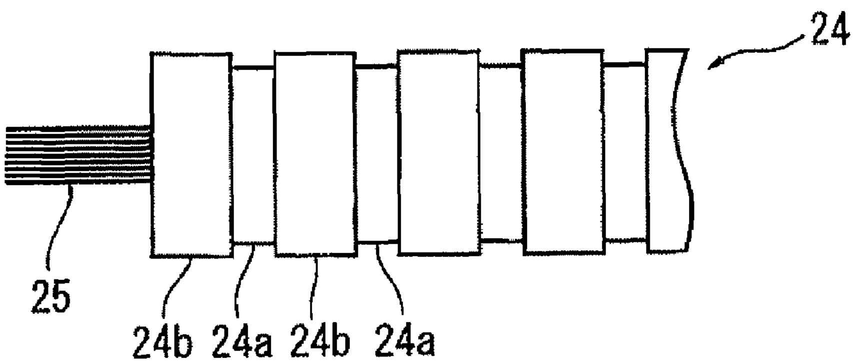

As shown in FIG. 3 and FIGS. 4A and 4B, the rigid body drum 21 is provided with a groove 21*a* along the rotation shaft direction in a part of the outer peripheral surface and is provided with a slip ring 24 as a feeding member for making electric connection of the matrix panel 30 and the outside in the shaft center part of the rigid body drum 21. The rigid body drum 21 rotates around the fixed slip ring 24. An appropriate number of terminals 22 are provided roughly along the rotation shaft direction of the rigid body drum 21. The terminals 22 are connected to the matrix panel 30 and drive the data drivers 31 (see FIG. 3) and the scanning drivers 32 (see FIG. 3). Further, a slider 23 extending in the rotation shaft direction and in a direction in which the terminals are away from each other is connected to each of the terminals 22, and a collector ring 24*a* of the slip ring 24 is attached to a recess part of the slider 23.

The collector ring 24*a* part of the slip ring 24 has a smaller diameter than insulating rings 24*b* on both sides and a state in which the slider 23 is in contact with the opposed collector ring 24*a* at all times is kept as the rigid body drum 21 rotates. The groove 21*a* of the rigid body drum 21 is closed with seal tape, for example, and resistance of an air current when the image hold body 20 rotates is decreased and the effect of toner at the developing time is also prevented.

Thus, transmission of a signal between the matrix panel 30 and the outside is performed from a lead line 25 wired in the slip spring 24 corresponding to the collector ring 24*a* of the slip ring 24 through the collector ring 24*a* and the slider 23 to the matrix panel 30. If the rigid body drum 21 rotates, transmission of a signal to the matrix panel 30 is performed appropriately.

A drive system of the image hold body 20 may be selected where appropriate if drive is transmitted through a drive transmission mechanism to the rigid body drum 21 in response to a drive source not shown (for example, a drive motor). The drive transmission mechanism is not limited. For example, the outer peripheral surface end part side of the rigid body drum 21 may be in press-contact with a rotation roll for rotation drive or a rotation shaft for rotating the rigid body drum 21 on a different side from the insertion side of the slip ring 24 may be provided.

Next, the peripheral structure containing the pixel electrode 34 of the matrix panel 30 will be discussed.

Figure 5A:
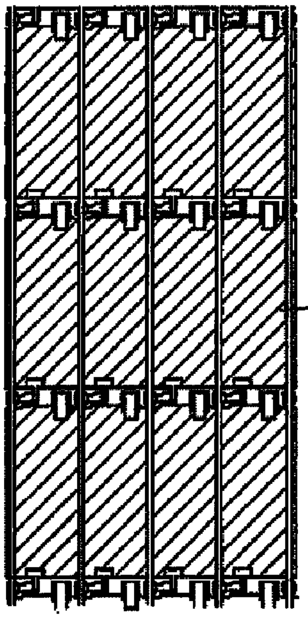
FIG. 5A is a schematic representation to show an arrangement example of pixel electrodes of the image hold body used in Embodiment 1 of the invention.
Figure 5B:
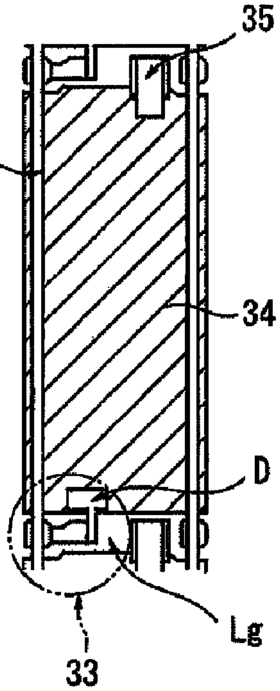
FIG. 5B is a schematic representation to show one of the pixel electrodes.
Figure 5C:
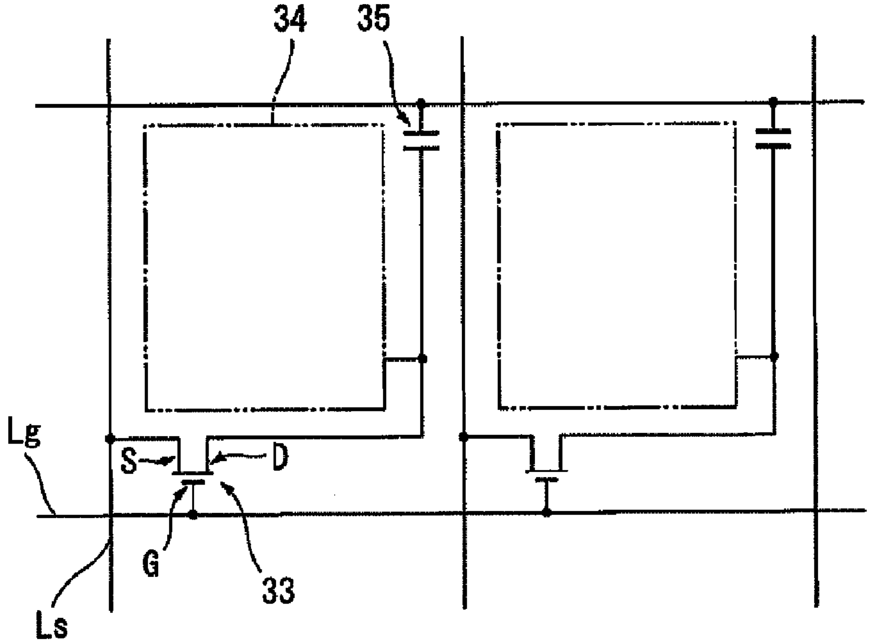
FIG. 5C is a schematic representation to show a wiring example to the pixel electrodes.

In the embodiment, the basic configuration of the matrix panel 30 is as shown in FIGS. 5A to 5C. The pixel electrodes 34 each provided for each pixel unit are arranged like a matrix and each pixel electrode 34 is formed as an active matrix system. For example, a TFT (Thin Film Transistor) 33 is used as a switch member (switching element) and a capacitance element 35 as a charge storage member and connecting wiring (source line Ls, gate line Lg, etc.,) are added to the TFT 33.

As the basic configuration of the TFT 33 (not shown), for example, a channel layer of a-Si (amorphous silicon) is formed through a gate insulating film provided so as to cover a gate G, and a source (electrode) S and a drain (electrode) D are placed on the channel layer with a predetermined spacing.

Connection of the pixels is an equivalent circuit as in FIG. 5C and is collected as a signal line Ls of connecting a source S of the TFT 33 for each data line and a scanning line Lg of connecting a gate G of the TFT 33 for each scanning line. The pixel electrode 34 and the capacitance element 35 are connected in parallel to a drain D of the TFT 33 and one parts of the capacitance elements 35 are collected for each scanning line.

Figure 6A:
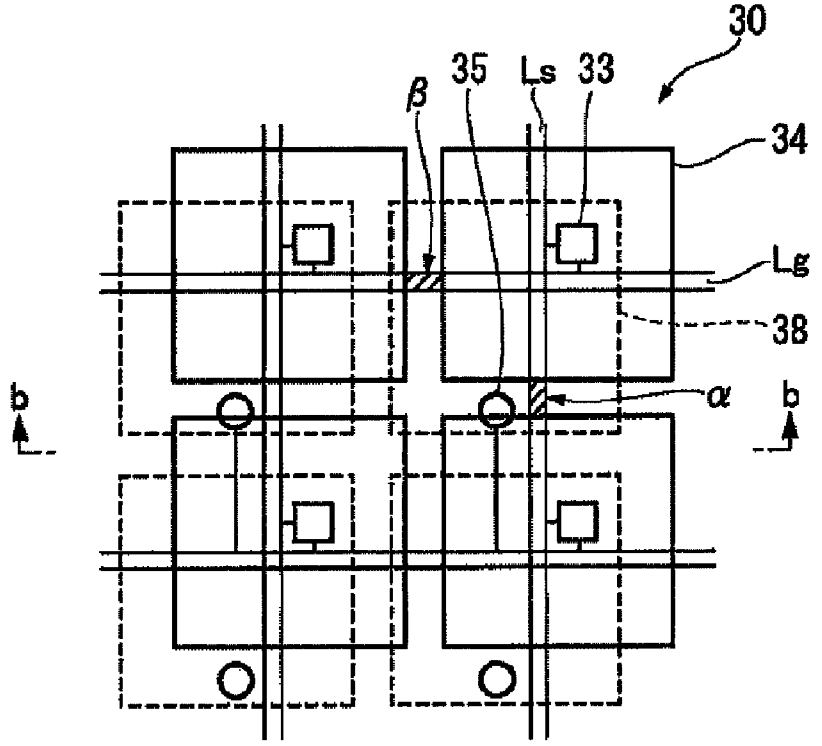
FIG. 6A is a schematic representation to show the configuration of a matrix panel used in Embodiment 1 of the invention and FIG. 6B is a sectional view taken on line b-b in FIG. 6A.
Figure 6B:
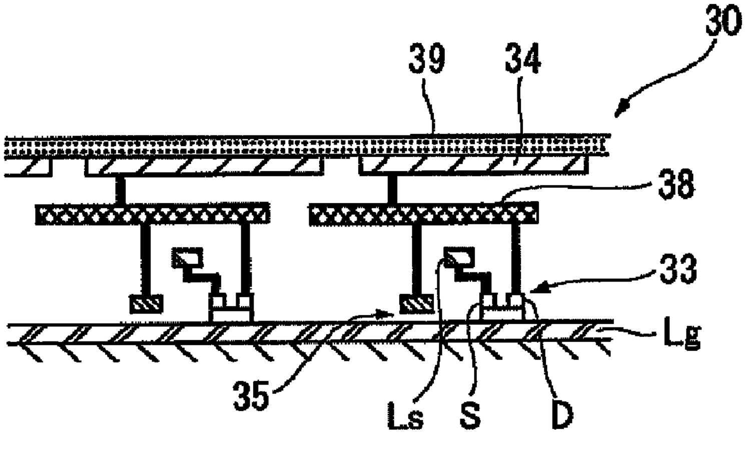

Particularly, in the embodiment, unlike FIG. 5, each pixel is configured as shown in FIGS. 6A and 6B. FIG. 6B is a sectional view taken on line b-b in FIG. 6A.

In the figures, the matrix panel 30 is characterized by the fact that various elements are placed on a film base material 301 and a shield electrode 38 made of a conductive film of the size close to that of the pixel electrode 34 is provided for each pixel electrode 34 aside from the pixel electrode 34.

Thus, on the film base material 301, first a scanning line LG is formed in a predetermined area and then a TFT 33 is formed so that a part becomes a gate G. A capacitance element 35 is formed with the adjacent scanning line Lg as one electrode. Further, the source S of the TFT 33 is connected to the signal line Ls as a data line through a conductor. On the other hand, the drain D is connected to the shield electrode 38 corresponding to each pixel electrode 34 through a conductor. Further, it is connected to the corresponding pixel electrode 34 and capacitance element 35 through the shield electrode 38. A protective film 39 is provided on the surface of the pixel electrode 34.

In such a configuration, the shield electrode 38 is formed at a position deeper than the pixel electrode 34 (film base material 301 side) and is placed at a slanting shift position from the corresponding pixel electrode 34 toward the adjacent pixel electrode 34 and thus the signal line Ls positioned between the adjacent pixel electrodes 34 (part indicated by α in the figure) is covered with the shield electrode 38. That is, the shield electrode 38 has a portion overlapping the adjacent pixel electrodes 34.

Further, in the embodiment, similar measures are also adopted for the scanning line Lg and the scanning line Lg positioned between the adjacent pixel electrodes 34 (part indicated by β in the figure) is also covered with the shield electrode 38.

Figure 7:
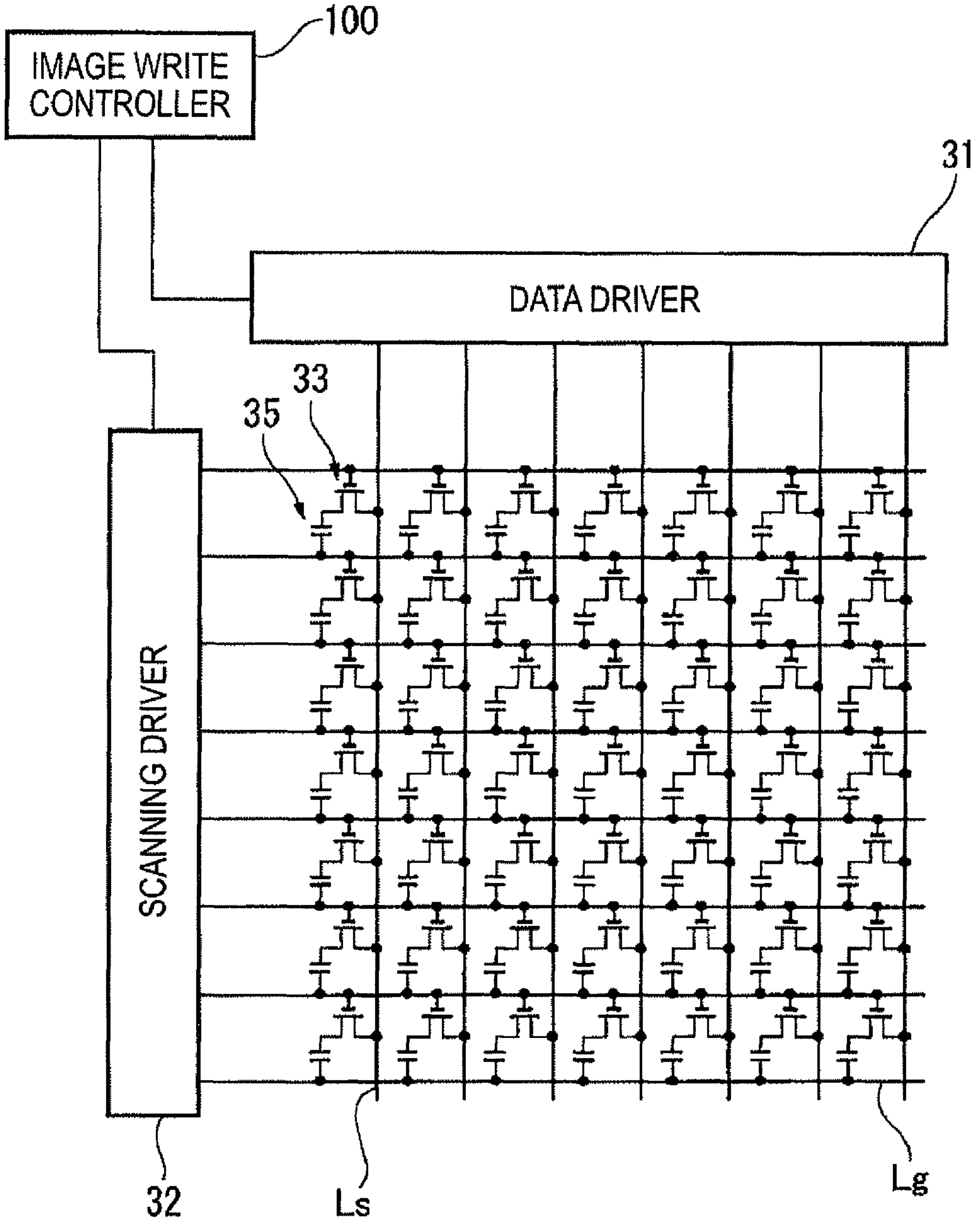
FIG. 7 is a schematic representation to show the wiring configuration of the matrix panel used in Embodiment 1 of the invention.

Since the matrix panel 30 thus has a large number of pixel electrodes 34 arranged like a matrix, the drive system is as follows:

In the matrix panel 30, as shown in FIG. 7, the signal lines Ls with a predetermined number of pixels collected for each data line and each scanning line and the source S sides of the TFTs 33 collected for each data line are connected to the data driver 31. On the other hand, the scanning lines Lg with the gate G sides of the TFTs 33 collected for each scanning line are connected to the scanning driver 32. The data driver 31 and the scanning driver 32 are driven by an image write controller 100 (described later in detail). The data driver 31 and the scanning driver 32 are driven at a predetermined timing, whereby a predetermined latent image voltage is applied to a predetermined pixel electrode 34. In the embodiment, another electrode of each capacitance element 35 is connected to the corresponding scanning line Lg. In the example, the capacitance elements 35 are connected to the scanning line Lg, but may be, for example, grounded or connected to another reference voltage collectively for each scanning line.

The data driver 31 is implemented as a shift register with sample hold, a latch, a buffer, etc., for example. The scanning driver 32 is implemented as a counter, a latch, a buffer, etc., for example. Although the pixel electrode 34 is not shown in FIG. 7, the pixel electrode 34 is connected between the drain D of the TFT 33 and the capacitance element 35 as shown in FIG. 5C, needless to say.

Figure 8:
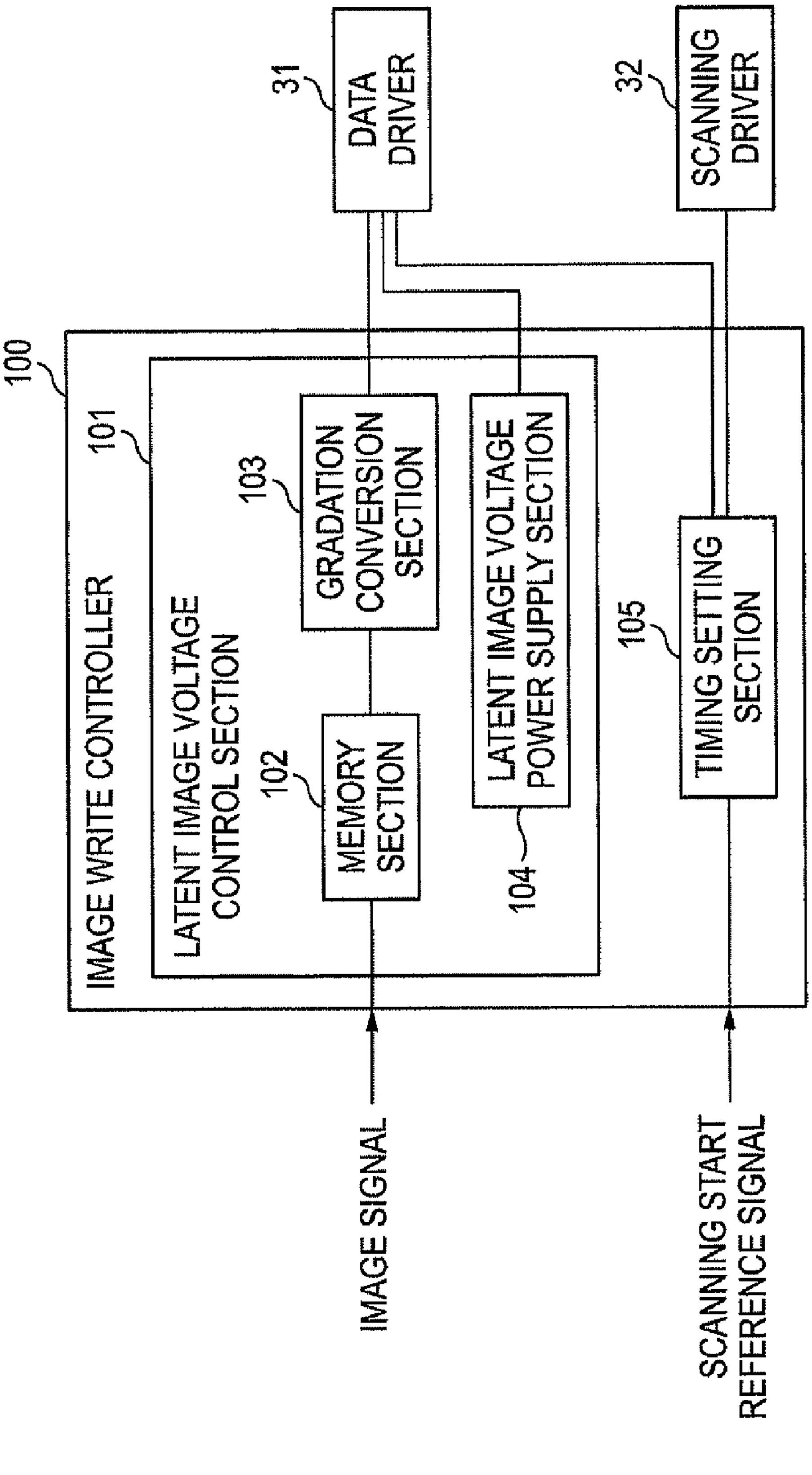
FIG. 8 is a schematic representation to show an example of an image write controller used in Embodiment 1 of the invention.

In the embodiment, the image write controller 100 includes a latent image voltage control section 101 for inputting an image signal on which a latent image to be written is based, a scanning start reference signal indicating the starting timing of latent image write to the image hold body 20, etc., and controlling so as to determine the latent image voltage applied to the corresponding pixel electrode 34 based on the image signal and a timing setting section 105 for setting various timings based on the scanning start reference signal, and sends a predetermined control signal to the data driver 31 and the scanning driver 32, as shown in FIG. 8.

The latent image voltage control section 101 includes a memory section 102 for storing image data from the image signal, a gradation conversion section 103 for executing gradation conversion of the image data from the memory section 102, and a latent image voltage power supply section 104 for supplying various latent image voltages distributed to the corresponding pixel electrodes 34 based on information provided by gradation conversion in the gradation conversion section 103.

Signals from the latent image voltage control section 101 and the timing setting section 105 are transmitted to the data driver 31 and on the other hand, the signal from the timing setting section 105 is transmitted to the scanning driver 32, whereby latent image voltage based on the image signal using each data line is written into each of the pixel electrodes 34 arranged on the scanning line selected and scanned at a predetermined timing.

Figure 9:
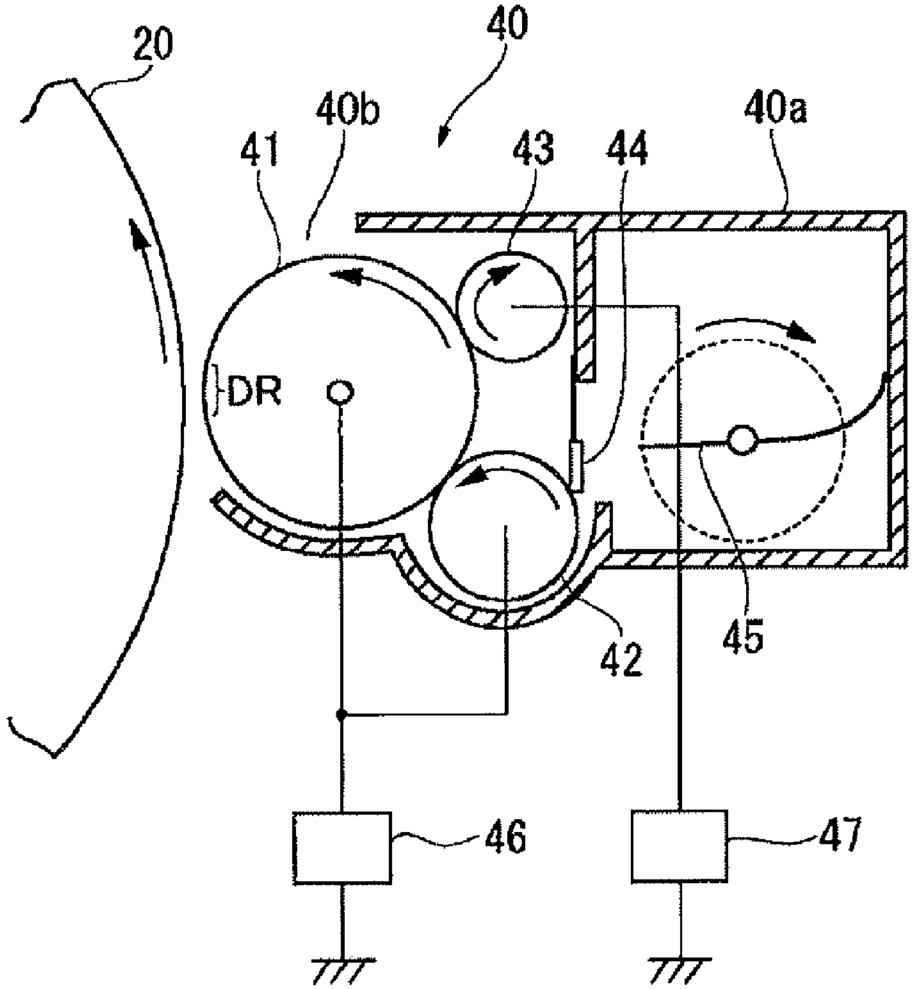
FIG. 9 is a schematic representation to show an example of a developing device used in Embodiment 1 of the invention.

As shown in FIG. 9, the developing device 40 in the embodiment has a developing vessel 40*a* for storing conductive toner (toner where appropriate), the developing vessel 40*a* is provided with a developing opening 40*b* opposed to the image hold body 20, a developing roll 41 is provided facing the developing opening 40*b*, is placed at a distance from the image hold body 20, and rotates in a different direction in an opposed part to the image hold body 20, and a latent image formed on the image hold body 20 is developed to provide a visual image in a developing area DR where the image can be developed in toner in the part where the image hold body 20 and the developing roll 41 are opposed to each other.

In the developing vessel 40*a*, a supply roll 42 for supplying toner to the developing roll 41 is included at a position opposed to the developing roll 41 and a charge pouring roll 43 for pouring charge into the toner on the developing roll 41 is included downstream in the rotation direction of the developing roll 41 from the supply roll 42. Further, the supply roll 42 is provided with a layer regulation blade 44 for regulating the layer thickness of the toner on the supply roll 42 and the layer thickness of the toner on the supply roll 42 is made roughly uniform. Further, an agitator 45 is provided on the back of the supply roll 42for supplying toner to the supply roll 42 while agitating the toner.

A developing bias from a bias power supply 46 is applied to the developing roll 41 and on the other hand, the bias power supply 46 is also supplied to the supply roll 42 and the supply roll 42 and the developing roll 41 are placed at the same potential. A bias power supply 47 is connected to the charge pouring roll 43 and a charge pouring bias larger than the developing vias is applied to the charge pouring roll 43. Therefore, a developing field acts between the image hold body 20 and the developing roll 41 and a charge pouring field acts between the developing roll 41 and the charge pouring roll 43.

In the embodiment, the developing roll 41 is formed of an aluminum roll with an anodized surface, for example, and the charge pouring roll 43 is formed of an aluminum roll with a surface formed with a small uniform tongued and grooved face by a sandblast method, a chemical etching method, etc. The developing roll 41 and the charge pouring roll 43 are in light contact with each other or are supported with a minute gap. The layer regulation blade 44 is provided by adhering silicone rubber or EPDM to a stainless plate spring in thickness of about 0.03 to 0.3 mm, for example, with an adhesive, etc., and has one end in light contact with the surface of the charge pouring roll 43 and an opposite end supported in a part of the developing vessel 40*a*.

Figure 10A:
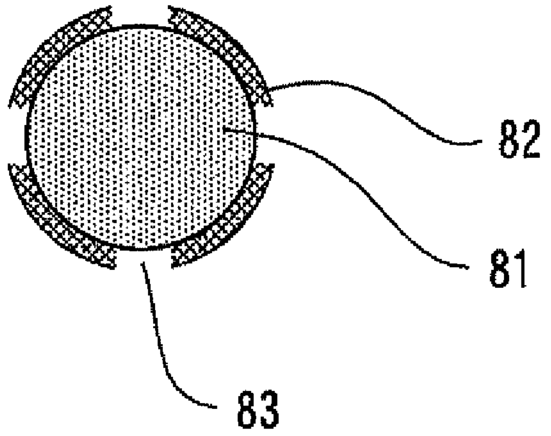
FIGS. 10A and 10B are schematic representations to show examples of conductive toner used in the developing device shown in FIG. 9.

The conductive toner used in the embodiment has a conductive toner base body (conductive core) 81 made of a material having conductivity, the surrounding of the conductive core 81 is covered with an insulative coat layer (for example, insulative resin layer) 82, and the insulative coat layer 82 is provided with an appropriate number of concave parts 83 so as to expose a part of the conductive core 81, for example, as shown in FIG. 10A. The conductive toner can be produced by a polymerization method, various known capsulation techniques, etc. At this time, the conductive core 81 is produced by dispersing a conductive agent of conductive carbon, transparent conductive powder, etc., of ITO, etc., in polyester-based resin, styrene acrylic-based resin, etc., or covering a particle surface made of polyester-based resin, styrene acrylic-based resin, etc., with the conductive agent.

If a high electric field is applied such conductive toner, tendency of lower resistance is shown. The magnitude of the electric field put into lower resistance depends on mainly the occupation ratio of the concave parts 83 of tone or the thickness of the insulative coat layer 82, etc. This mechanism is estimated as follows: Since the conductive core 81 is covered with the insulative coat layer 82, the conductive cores 81 scarcely come in contact with each other and scarcely come in direct contact with an electrode member, etc., and a given minute gap is kept through the insulative coat layer 82. Consequently, for example, when a high electric field is applied, conduction occurs because of tunnel effect, etc.

Figure 10B:
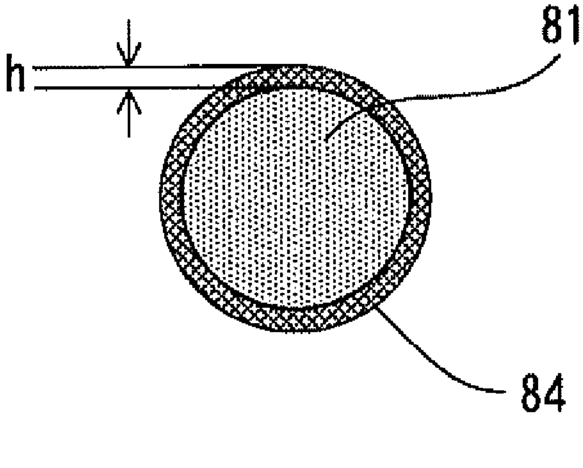

As another form of the conductive toner, the conductive core 81 is covered with an insulative or semiconductive coat layer 84 and thickness h of coat layer 84 is adjusted where appropriate, whereby resistance of the toner can be adjusted, for example, as shown in FIG. 10B. At this time, for the semiconductive coat layer 84, a semiconductive material may be used or, for example, semiconductive resin having a minute amount of metal oxide of titanium oxide, tin oxide, etc., and conductive carbon contained in insulative resin may be used. As the conductive core 81, for example, a core provided by depositing conductive fine particles in the proximity of the outer surface of an insulative toner base body (insulative core) made of usual insulative toner, a core provided by mixing conductive fine particles into an insulative core may be selected where appropriate.

The operation of the developing device 40 using such conductive toner will be discussed based on FIG. 9. In the developing vessel 40*a*, conductive toner is agitated by the agitator 45 and the agitated toner is supplied to the supply roll 42. The toner supplied to the supply roll 42 passes through space between the supply roll 42 and the layer regulation blade 44, whereby a uniform toner layer is formed on the surface of the supply roll 42. The toner layer is conveyed to a part opposed to the developing roll 41 by rotation of the supply roll 42, is supplied onto the developing roll 41, and is retained. In a part opposed to the charge pouring roll 43, charge is poured into the toner retained on the developing roll 41 according to a charge pouring field formed therebetween. The toner into which the charge is poured is retained on the developing roll 41, is conveyed, and is supplied to the developing area DR.

The operation of the image forming apparatus according to the embodiment will be discussed.

First, an electrostatic voltage based on an image signal of each color component is applied to each pixel electrode 34 of the image hold body 20 of each color component using the image write controller 100 and an electrostatic latent image of each color component is written corresponding to each pixel electrode 34.

Next, as shown in FIG. 2, the latent image of each color component formed on each image hold body 20 is visualized in each color toner in the developing device 40 and each color tone image is primarily transferred onto the intermediate transfer belt 50 in each transfer device 63. Then, each color tone image on the intermediate transfer belt 50 is secondarily transferred to a record material in the secondary transfer device 60 and then is fixed on the record material in the fixing device 76 and the record material is discharged. The residual toner remaining on each image hold body 20 is cleaned by the cleaner 62.

Latent image write in the pixel electrodes 34 in each image holder 20 will be discussed with FIGS. 5 and 8.

When an ON voltage is applied to the gate G of the TFT 33 connected to the scanning line Lg selected by the scanning driver 32, a conduction state occurs between the source S and the drain D of the TFT 33. At this time, latent image voltage based on an image signal is supplied to each data line (signal line Ls) by the data driver 31 and is supplied to the source voltage of the TFT 33 of each pixel, whereby the capacitance element 35 is charged until it becomes equivalent to the source voltage by the TFT 33 turned ON. Potential of the pixel electrode 34 (corresponding to the latent image voltage) is provided by the charge charged in the capacitance element 35. In the state, if an OFF voltage is applied to the gate G and the part between the source S and the drain D in the conduction state is shut off, the charge charged by the capacitance component of the capacitance element 35 is retained as it is and thus if the source voltage later changes, the latent image voltage of the pixel electrode 34 into which the latent image is written is retained as it is.

Next, the relationship between the latent image voltage written into the pixel electrode 34 and the developing step in the image forming process will be discussed.

Figure 11A:
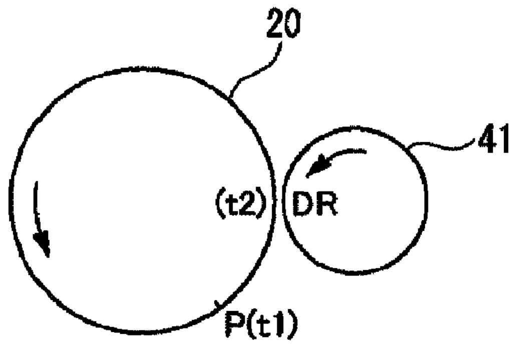
FIGS. 11A and 11B are schematic representations to show the effect of electric field action of a signal line on a latent image write position and a developing position.
Figure 11B:
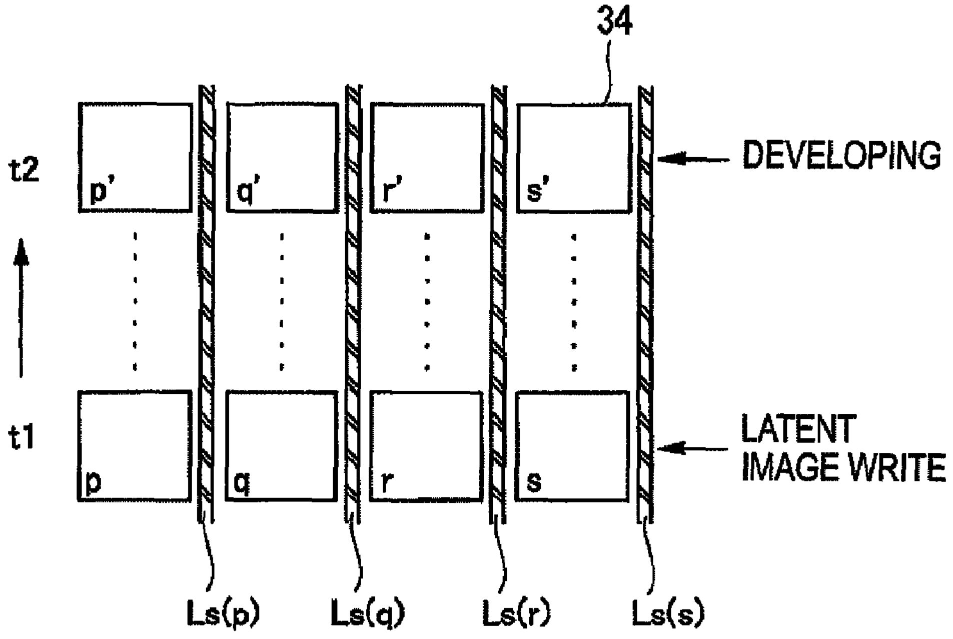

FIG. 11 describes the relationship between the latent image write position and the developing position; FIG. 11A shows the position relationship between the image hold body 20 and the developing roll 41 and FIG. 11B shows motion of each pixel electrode 34.

Assuming that the latent image write position is P and write is made into four pixel electrodes 34 of p, q, r, and s at time t1, the pixel electrodes 34 into which write is made at the time t1 arrive at the developing area DR at t2 by rotation of the image hold body 20 and developing is performed in the area. However, at the stage at which the pixel electrodes 34 are actually developed in the developing area DR, a signal corresponding to the pixel electrode 34 at the latent image write position P newly is transmitted to the signal line Ls in the proximity of the pixel electrode 34. That is, for example, assuming that the pixel electrode 34 at the developing time is p', at this time, a signal to the pixel electrode 34 for p at the latent image write position is transmitted to the adjacent signal line Ls (p). Thus, at the developing time, the effect of the signal line Ls (p) in addition to the latent image voltage of the pixel electrode 34 is also added and the effect on the image density and the image quality occurs. Likewise, the effect from signal lines Ls (q), Ls (r), and LS (s) is added to the pixel electrodes 34 corresponding to other pixel electrodes q', r', and s'.

Particularly, if the signal line Ls is formed in the same plane as the pixel electrode 34, a large effect is produced. However, if the signal line Ls is buried and formed at a deeper position than the pixel electrode 34, the effect cannot completely be excluded. If the signal line Ls is formed just below the pixel electrode 34, the effect between the adjacent pixel electrodes 34 (in this case, between the pixel electrodes 34 arranged along the rotation direction of the image hold body 20) cannot be excluded.

Figure 12:
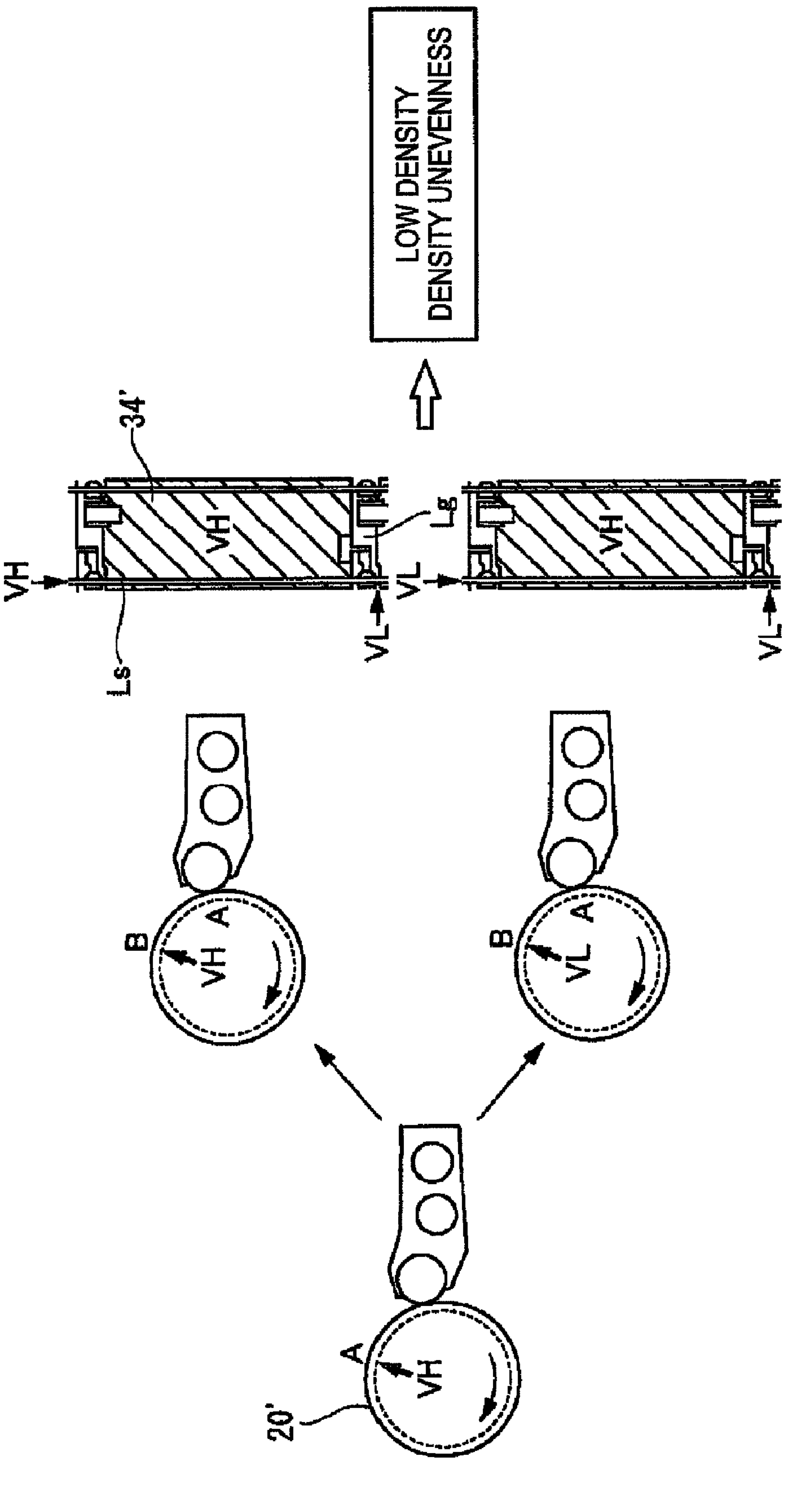
FIG. 12 is a first schematic representation to show the effect from the signal line in a mode in which no shield member is provided for comparison.
Figure 13:
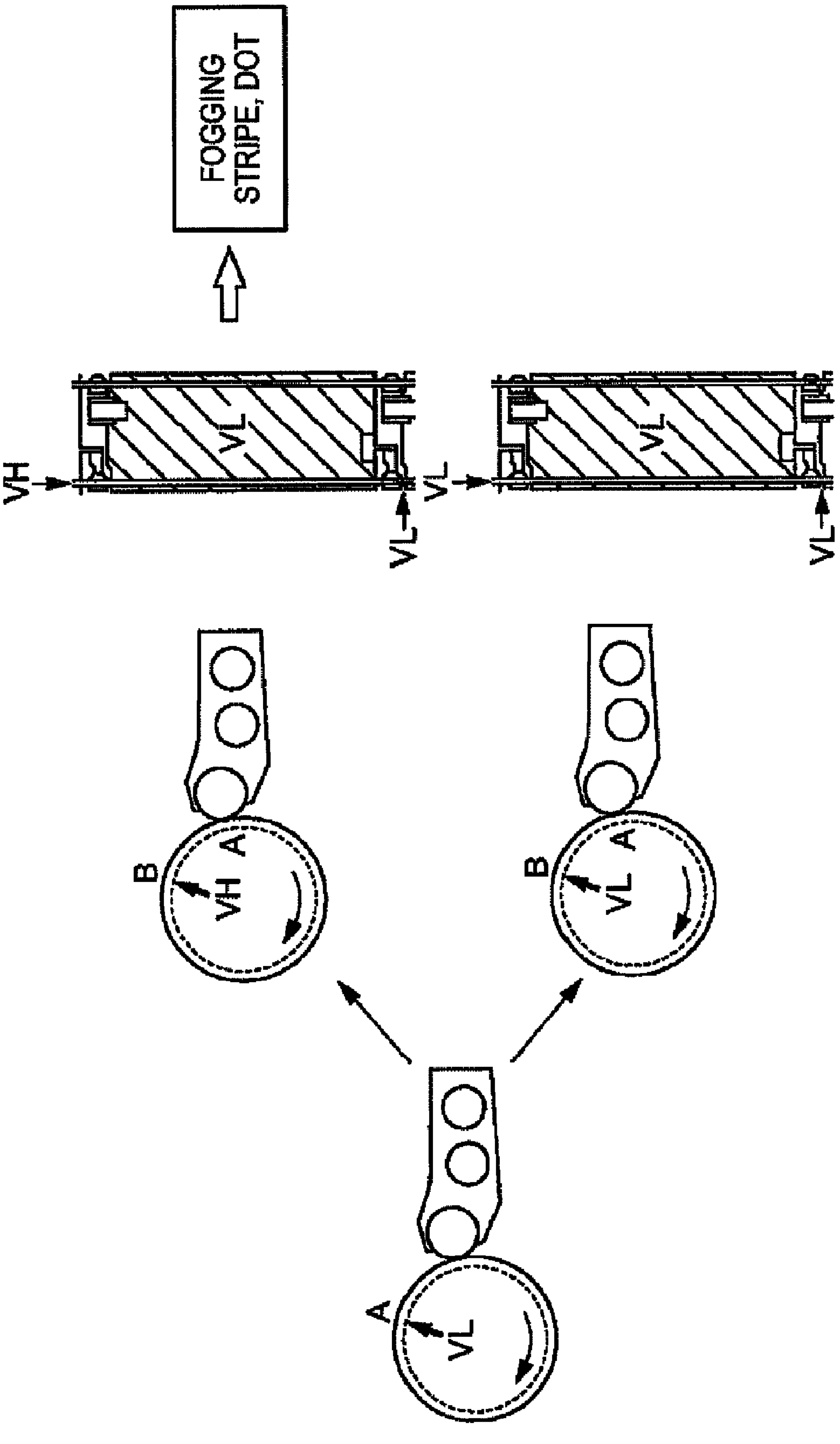
FIG. 13 is a second schematic representation to show the effect from the signal line in the mode in which no shield member is provided for comparison.

FIGS. 12 and 13 are schematic representations to show how the effect from the signal line Ls at the developing time is produced when no shield member is provided for comparison. Here, an example wherein negative charge toner is used and an image signal is binarized is shown and it is assumed that a high voltage (VH) is added to the pixel electrode 34 and the signal line Ls, toner is sucked and a low voltage VL is added, toner is not sucked.

As in FIG. 12, if VH is written into a pixel electrode 34' at A position of an image hold body 20' and VH and VL are added to the signal line Ls at B position when the A position arrives at the developing position, the electric field action from the signal line Ls affects the pixel electrode 34' at the developing time and the density in the proximity of the signal line Ls becomes high or low. As a result, low density or density unevenness occurs.

On the other hand, as in FIG. 13, if VL is written into the pixel electrode 34' at the A position of the image hold body 20' and VH and VL are added to the signal line Ls at the B position when the A position arrives at the developing position, when VL is added, no effect is produced. However, when VH is added, image degradation of fogging, stripe, dot dirty, etc., is produced in the proximity of the signal line Ls.

To prevent such image degradation, it is necessary to prevent the effect of the electric field action from the signal line Ls at the developing time.

In the embodiment, as shown FIGS. 6A and 6B, the signal line is buried and placed to the film base material 301 from the pixel electrode 34 and further the shield electrode 38 is provided so as to cover the signal line Ls positioned between the adjacent pixel electrodes 34 (part indicated by α in the figure) and is connected to the corresponding pixel electrode 34, whereby the effect of the electric field action from the signal line Ls at the developing time is almost removed and a good image responsive to the latent image voltage is provided.

Further, in the embodiment, the scanning line Lg is also covered with the shield electrode 38 and thus if VH is applied to the scanning line Lg (corresponding to OFF voltage of the TFT 33), the effect of the electric field action from the scanning line Lg is removed.

In the embedment, the mode in which the shield electrode 38 is connected to the corresponding pixel electrode 34 is shown, but the embodiment is not limited to the mode. The shield electrode 38 may be connected to reference voltage; for example, it is connected to VL, whereby occurrence of fogging is still more suppressed and density unevenness is decreased. However, when the density tends to lower as a whole, if the latent image voltage is changed to a large value in the pixel electrode 34 so as to compensate for that, no problem arises.

Further, in the embodiment, the scanning line Lg is one electrode of the capacitance element 35, but the invention is not limit to it. For example, an electrode of the capacitance element 35 may be provided aside from the scanning line Lg and may be connected to the reference voltage. As the image forming apparatus, an apparatus for covering four colors is shown, but the apparatus may be a single-color image forming apparatus, needless to say.

Figure 14A:
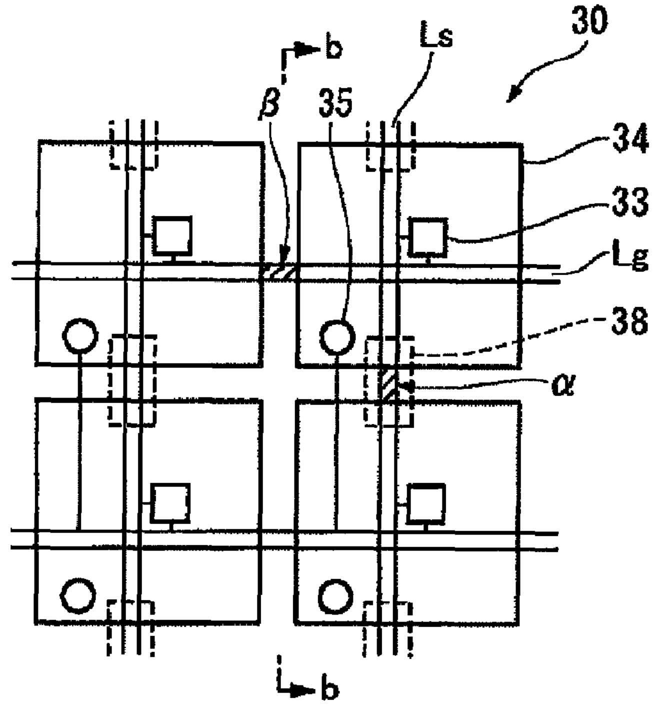
FIG. 14A is a schematic representation to show the configuration of a matrix panel used in Embodiment 2 of the invention and FIG. 14B is a sectional view taken on line b-b in FIG. 14A.

In the embodiment, the shield electrode 38 is placed in the deeper position than the pixel electrode 34, but may be provided further on the surface side from the pixel electrode 34. However, from the viewpoint of providing a stable image by the pixel electrode 34 and the viewpoint of aiming at higher density, preferably the shield electrode 38 is placed in the deeper position than the pixel electrode 34, FIG. 14A is a schematic representation to show the configuration of a matrix panel 30 of Embodiment 2 of the invention and 14B is a sectional view taken on line b-b in FIG. 14A. In the embodiment, unlike Embodiment 1 (see FIG. 6), the area of a shield electrode 38 is narrow and does not cover a scanning line Lg. Components similar to those of Embodiment 1 are denoted by the same reference numerals and will not be discussed again in detail.

In the figure, in the matrix panel 30, various elements are placed on a film base material 301 and a shield electrode 38 is provided at a deeper position than a pixel electrode; the shield electrode 38 is provided so as to have an overlap portion with the pixel electrodes so as to cover a signal line Ls positioned between adjacent pixel electrodes.

Figure 14B:
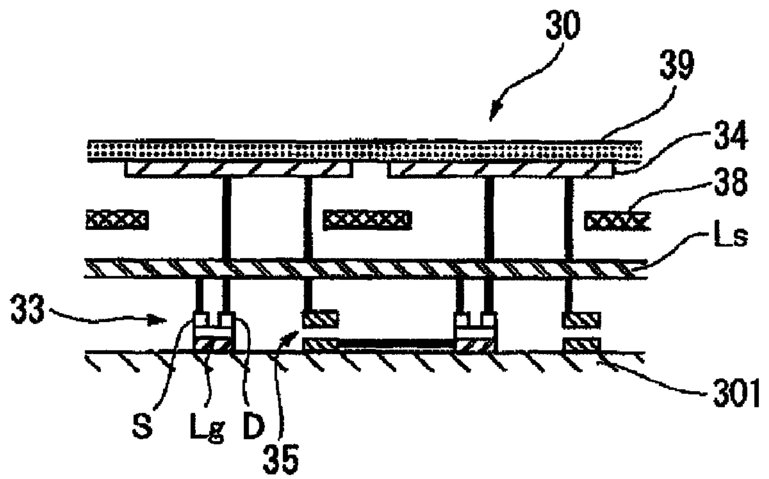

Thus, the scanning line is formed in a predetermined area on the film base material 301 and then a TFT 33 is formed with a part as a gate. A capacitance element 35 is formed with an adjacent scanning line as one electrode. FIG. 14B describes the capacitance element 35; the capacitance element 35 becomes a position hidden in the TFT 33 viewed from FIG. 14A and thus shown as in FIG. 14B for easy understanding.

The shield electrode 38 is provided so as to cover space between the adjacent electrodes 34 and in the embodiment, the shield electrode 38 are connected to each other and are connected to reference voltage.

On the other hand, a source S of the TFT 33 is connected to the signal line Ls through a conductor and a drain D is connected to each pixel electrode 34 through a conductor and is connected through the pixel electrode 34 to the capacitance element 35. Then, a protective film 39 is provided so as to cover the surface of the pixel electrode 34.

Such a configuration is adopted, whereby the signal line Ls positioned between the adjacent pixel electrodes 34 (part indicated by α in the figure) is covered with the shield electrode 38 and the effect of the electric field action caused by the signal line Ls at the developing time is suppressed and a good image is provided.

In the embodiment, the scanning line Lg positioned in the area between the adjacent pixel electrodes 34 (part indicated by β in the figure) is not covered with the shield electrode 38, but the scanning line Lg exists in a deeper position and thus the effect of the electric field action is small as compared with the signal line Ls and the effect on the latent image voltage of the pixel electrode 34 scarcely exists. The part of the scanning line Lg may be covered with the shield electrode 38, needless to say.

Figure 15A:
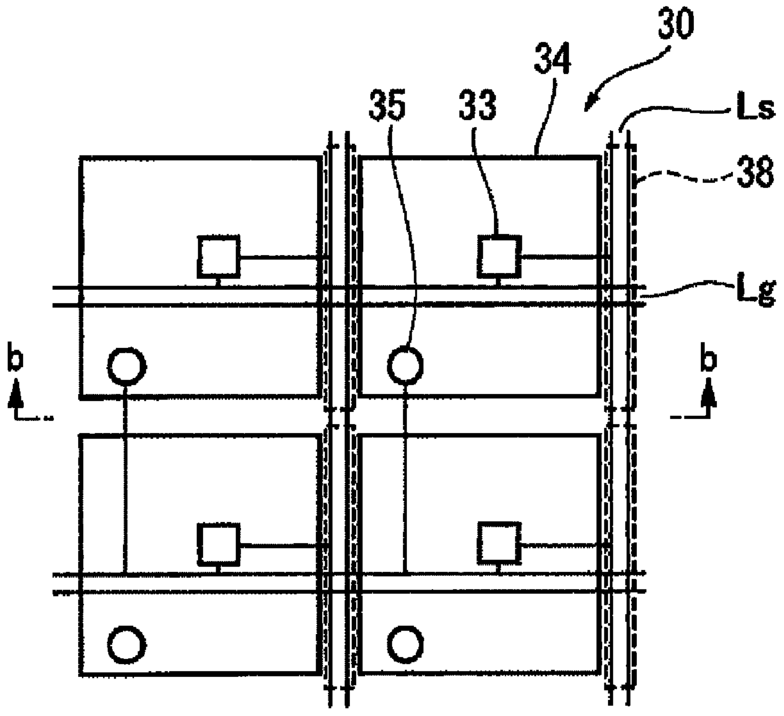
FIG. 15A is a schematic representation to show the configuration of a matrix panel used in Embodiment 3 of the invention and FIG. 15B is a sectional view taken on line b-b in FIG. 15A.
Figure 15B:
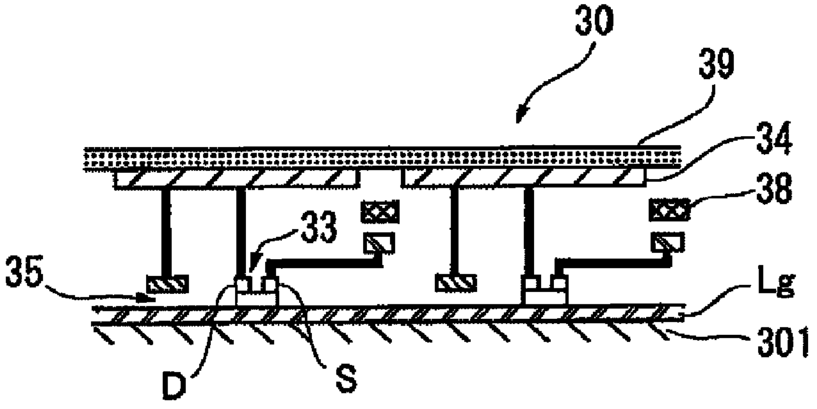

FIG. 15A is a schematic representation to show the configuration of a matrix panel 30 of Embodiment 3 of the invention and 15B is a sectional view taken on line b-b in FIG. 15A. In the embodiment, unlike Embodiment 1 (see FIG. 6), a signal line Ls is provided along space between adjacent pixel electrodes 34 and does not overlap a pixel electrode 34. Components similar to those of Embodiment 1 are denoted by the same reference numerals and will not be discussed again in detail.

In the figure, in the matrix panel 30, various elements are placed on a film base material 301 and the signal line Ls is provided along space between the adjacent pixel electrodes 34 aside from pixel electrodes and a shield electrode 38 is provided so as to cover a part of the signal line.

Thus, a scanning line Lg is formed in a predetermined area on the film base material 301 and then a TFT 33 provided with a gate is formed in a part. A capacitance element 35 with the adjacent scanning line Lg as one electrode is formed. The signal line Ls is provided between the adjacent pixel electrodes 34 and is connected to a source S of the TFT 33 corresponding to the signal line Ls through a conductor. Further, the shield electrode 38 is formed so as to cover the signal line Ls between the adjacent pixel electrodes 34. In the embodiment, the shield electrodes 38 are connected to each other and are connected to reference voltage.

On the other hand, a drain D of the TFT 33 is connected to each pixel electrode 34 through a conductor and is connected through the pixel electrode 34 to the capacitance element 35. Then, a protective film 39 is provided so as to cover the surface of the pixel electrode 34.

The shield electrode 38 does not completely cover space between the adjacent pixel electrodes 34 and covers the signal line Ls and covers a part between the pixel electrodes 34. However, to more lighten the effect of the electric field action caused by the signal line Ls, preferably space between the pixel electrodes 34 along the line width direction of the signal line Ls is completely covered.

The signal line Ls is covered with the shield electrode 38 as in the embodiment, whereby the effect of the electric field action caused by the signal line Ls at the developing time can be suppressed effectively.

In the embodiment, the scanning line Lg between the adjacent pixel electrodes 34 is not covered with the shield electrode 38. However, when the shield electrode 38 for covering the signal line Ls is provided, if space between the pixel electrodes 34 is completely covered, the scanning line Lg is also covered and the effect of the electric field action from the scanning line Lg is lightened.

Figure 16:
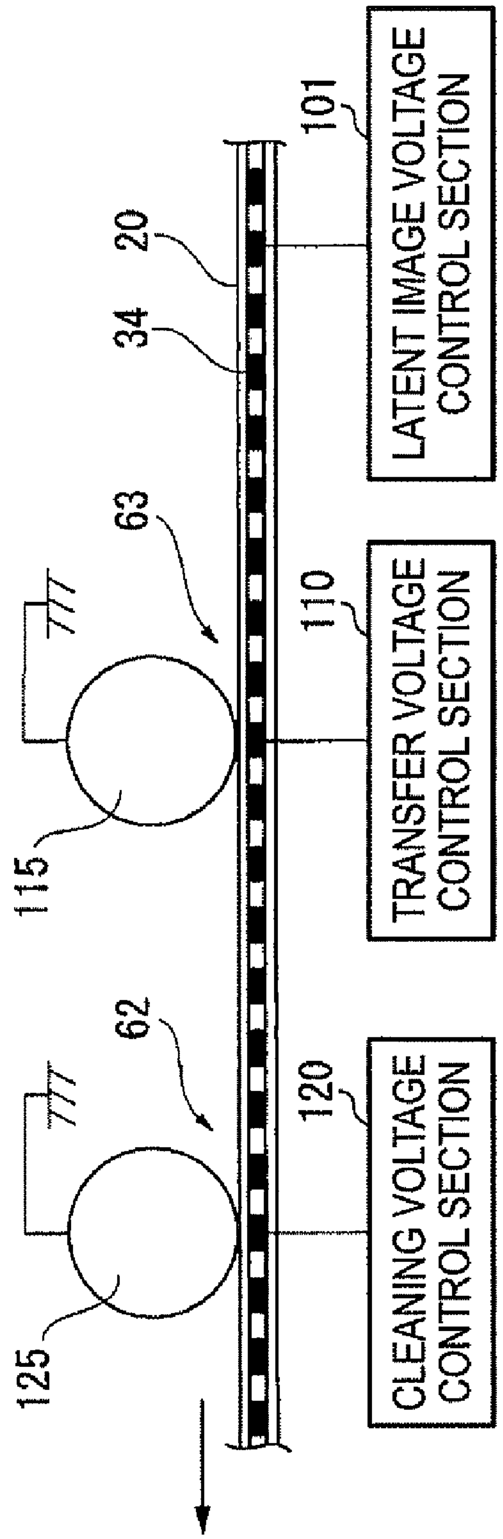
FIG. 16 is a schematic representation to show an outline of an image forming apparatus of Embodiment 4 of the invention.

FIG. 16 is a schematic representation to show an outline of an image forming apparatus according to Embodiment 4 of the invention.

In the figure, the basic configuration of the image forming apparatus is roughly similar to that of Embodiment 1, but they differ in transfer device 63 and cleaner 62. Components similar to those of Embodiment 1 are denoted by the same reference numerals and will not be discussed again in detail.

In Embodiment 4, the transfer device 63 provides a transfer voltage control section 110 in an image write controller 100 using pixel electrodes 34 of an image hold body 20 and applies a transfer voltage controlled in the transfer voltage control section 110 to each pixel electrode 34 to form a transfer field between the image hold body 20 and a counter electrode 115 opposed to the image hold body 20.

On the other hand, the cleaner 62 provides a cleaning voltage control section 120 in the image write controller 100 using the pixel electrodes 34 of the image hold body 20 and applies a cleaning voltage controlled in the cleaning voltage control section 120 to each pixel electrode 34 to form a cleaning field between the image hold body 20 and a counter electrode 125 opposed to the image hold body 20.

Figure 17:
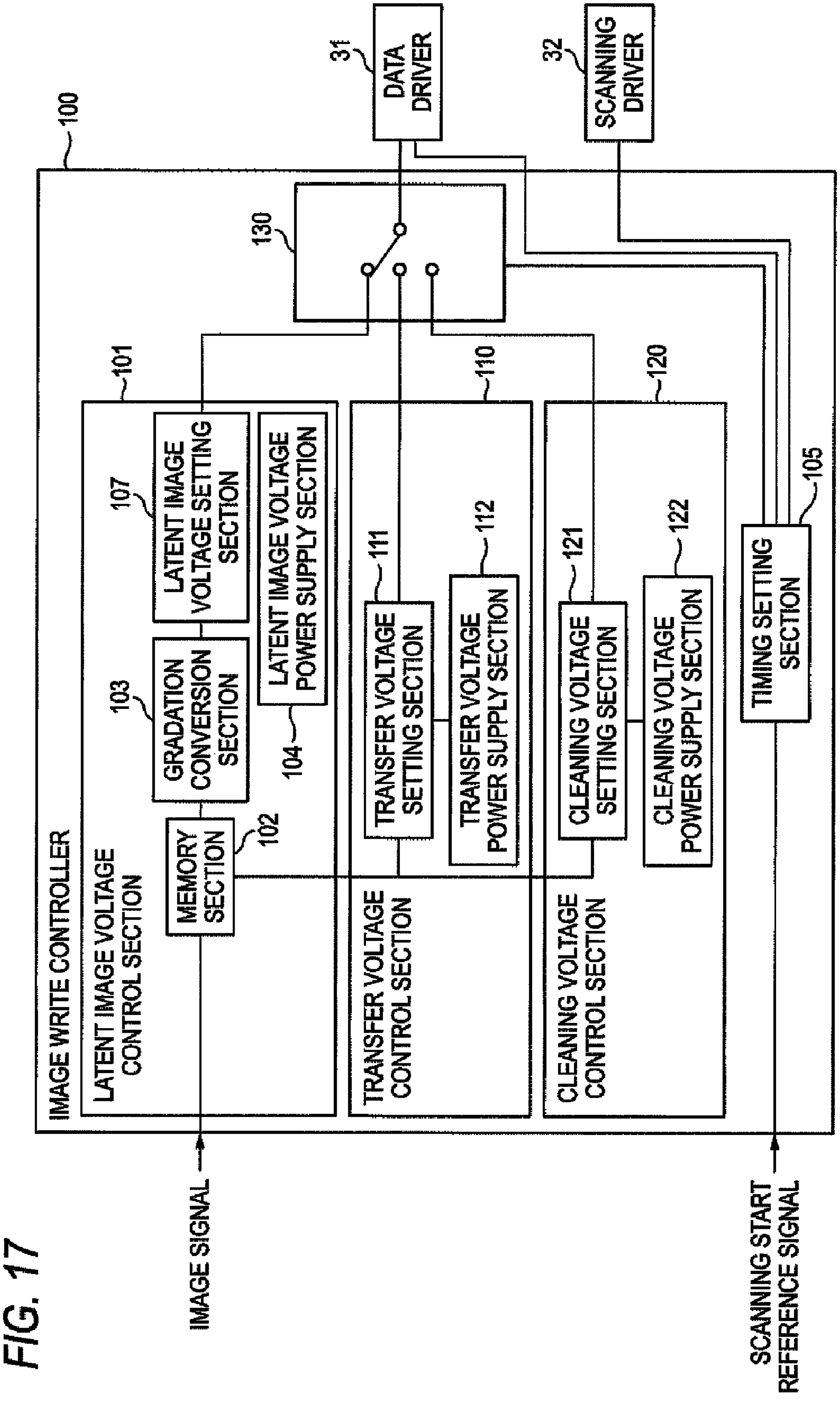
FIG. 17 is a schematic representation to show an example of an image write controller used in Embodiment 4 of the invention.

The image write controller 100 of the embodiment, unlike that of Embodiment 1, adopts the configuration wherein a latent image voltage control section 101 is provided with a latent image voltage setting section 107, as shown in FIG. 17. The latent image voltage setting section 107 sets any desired latent image voltage from a latent image voltage power supply section 104 based on a signal from a gradation conversion section 103.

The transfer voltage control section 110 includes a transfer voltage setting section 111 for setting a transfer voltage for each pixel electrode 34 based on image data stored in a memory section 102 of the latent image voltage control section 101 and a transfer voltage power supply section 112 for supplying specific various transfer voltages to the transfer voltage setting section 111.

Further, the cleaning voltage control section 120 includes a cleaning voltage setting section 121 for setting a cleaning voltage for each pixel electrode 34 based on image data stored in the memory section 102 of the latent image voltage control section 101 and a cleaning voltage power supply section 122 for supplying specific various cleaning voltages to the cleaning voltage setting section 121.

Further, the image write controller 100 sends each control voltage (latent image voltage, transfer voltage, cleaning voltage) controlled in the latent image voltage control section 101, the transfer voltage control section 110, and the cleaning voltage control section 120 to a data driver 31 through a switch section 130.

Thus, in the embodiment, the transfer device 63 and the cleaner 62 form the transfer field and the cleaning field in a state in which the control voltages of the transfer voltage, the cleaning voltage, etc., are controlled in the pixel electrode 34 units. Thus, if the amount of a transfer toner image and the amount of residual toner are predicted from an image signal, it is made possible to finely adjust the transfer field and the cleaning field in the pixel electrode 34 units, and transfer performance and cleaning performance are more improved.

In the embodiment, both the transfer device 63 and the cleaner 62 use the pixel electrodes, but the embodiment is not limited to the mode; either may be adopted. The latent image voltage setting section 107, the transfer voltage setting section 111, the cleaning voltage setting section 121, and the switch section 130 may be built in the data driver 31; components may be selected where appropriate conforming to the configuration of the matrix 30.

Figure 18:
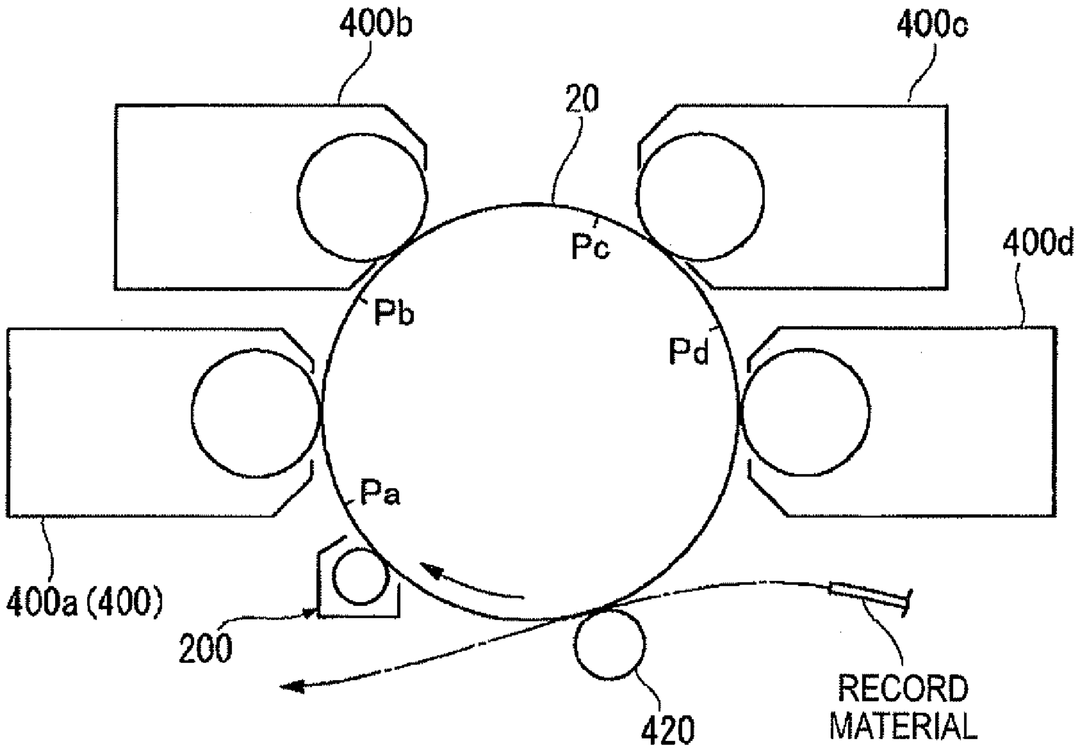
FIG. 18 is a schematic representation to show an outline of an image forming apparatus of Embodiment 5 of the invention.

FIG. 18 shows an outline of an image forming apparatus of Embodiment 5 of the invention. Unlike the image forming apparatus of Embodiment 1 (see FIG. 3), one image hold body 20 is surrounded by a plurality of (in the example, four) developing devices 400 (400*a* to 400*d*).

The image hold body 20 of Embodiment 5 has a roughly similar configuration to that of Embodiment 1 and is provided with pixel electrodes (not shown) arranged like a matrix. The developing devices 400 (400*a* to 400*d*) corresponding to colors of yellow, magenta, cyan, and black are placed in the surrounding of the image hold body 20 and develop latent images formed on the image hold body 20 to form a multiple color toner image. The image hold body 20 is also surrounded by a transfer device 420 provided between the developing devices 400*d* and 400*a* for transferring the toner image formed on the image hold body 20 onto a record material. Further, a cleaner 200 is provided between the transfer device 420 and the developing device 400*a*.

As the developing device 400, the developing device 40 (for example, see FIG. 9) using conductive toner as in Embodiment 1 may be used or a developing device using usual frictional electrification type toner may be used.

A latent image write step and a developing step in the described image forming apparatus will be discussed.

As shown in FIG. 18, assuming that for the developing area of each developing device 400, positions indicated by Pa to Pd are latent image write positions corresponding to the developing devices 400*a* to 400*d*, first, at the timing at which a predetermined scanning line arrives at the latent image write position Pa, ON voltage is added to the scanning line corresponding to the scanning line of the image hold body 20 and TFT is turned ON. Conforming to this timing, latent image voltage responsive to a yellow image signal, for example, corresponding to the developing device 400*a* is supplied to a signal line of each data line, whereby a latent image responsive to the yellow image signal is formed for the pixel electrodes on one scanning line.

Next, similar operation is performed for the scanning line at the latent image write position Pb and a latent image responsive to a magenta image signal, for example, is formed. Further, similar operation is performed at the latent image write positions Pc and Pd in order in a similar manner, whereby latent images on cyan and black scanning lines, for example. Such operation is repeated in order and then the process returns to the latent image write position Pa and similar operation is repeated.

On the other hand, in the developing devices 400, the latent images written at the latent image write positions Pa to Pd are developed in color toner in the developing areas. For the first latent image, latent image voltage which becomes a non-image part (background part) may be added to each signal line for each pixel of the scanning line corresponding to the Pb position until the scanning line written at the latent image write position Pa, for example, arrives at the latent image write position Pb. This is performed at the latent image write positions Pc and Pd in a similar manner, whereby a multiple color toner image is formed the image hold body 20 passing through the last developing device 400*d*. The latent images corresponding to the developing devices 400*a* to 400*d* are written in order at the latent image write positions Pa to Pd by time-dividing drive, whereby the color toner images are put on the image hold body 20 in order as a multiple color toner image.

This multiple color toner image is transferred onto a record material in the transfer device 420.

The effect of the signal line at the developing time also appears in such a system. Thus, to suppress this, shield electrodes may be provided.

The system of putting the color toner images formed on the image hold body 20 on the image hold body 20 as a multiple color toner image lessens the number of components and consequently is advantageous for miniaturization and cost reduction of the apparatus as compared with the system of forming color toner images on a plurality of image hold bodies 20 and putting the toner images transferred from the image hold bodies 20 into a multiple color toner image.

In the example, a pixel electrode member is assumed and the effect of the field effect action caused by a signal line when no shield electrodes are provided was simulated and calculated.

Figure 19A:
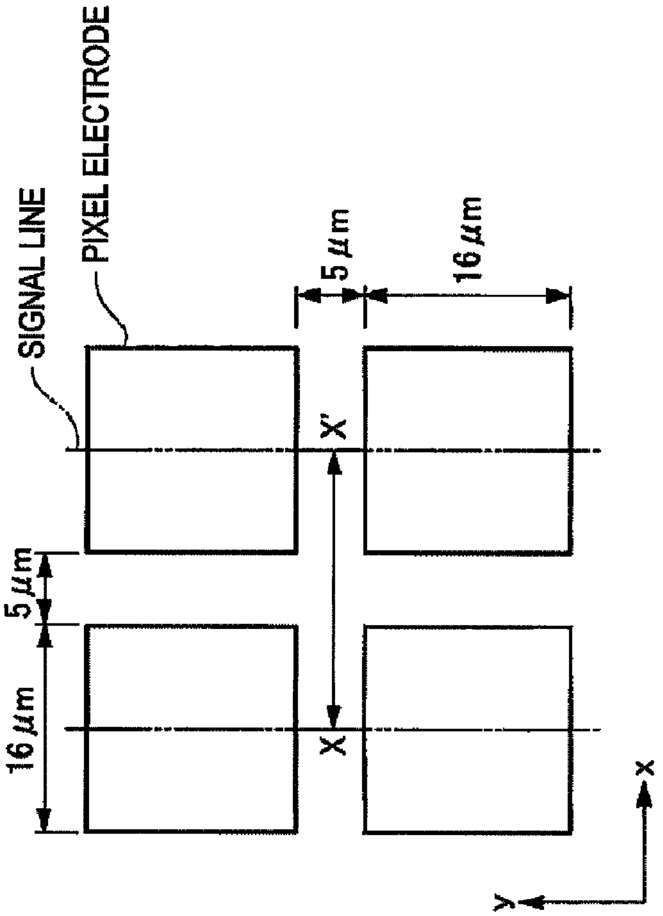
FIG. 19A is a schematic representation to show a layout used in an example and FIG. 19B shows cross sections in an x direction and a y direction in FIG. 19A.
Figure 19B:
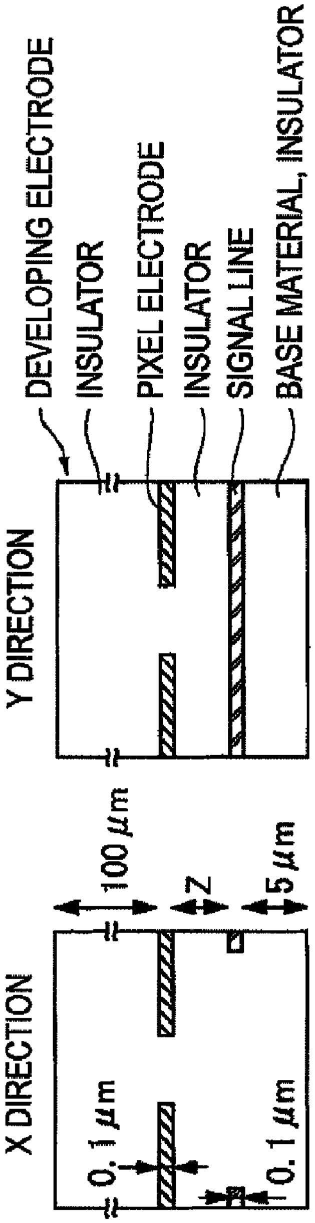

As the calculation conditions, pixel electrodes each 16 μm square were arranged with a spacing of 5 μm and each signal line was set so as to pass through the center of the pixel electrodes, as shown in FIG. 19A. As shown in a sectional view of FIG. 19B, the thickness of each of the pixel electrode and the signal line was 0.1 μm and the distance from the lower face of the pixel electrode to the surface of the signal line (corresponding to the burying depth of the signal line) Z was used as a factor; here, calculation was performed at four levels (1, 3, 5, and 10 μm) in the range of 1 to 10 μm). Further, in the calculation, the following conditions were added: Developing electrode potential=0 V, distance from developing electrode to pixel electrode=100 μm, dielectric constant ∈ in this portion=1, dielectric constant ∈ of insulator and base material below pixel electrode=5, and line width of signal line=2 μm.

The calculation was performed about the electric field action of the signal line between the pixel electrodes according to the conditions.

Figure 20:
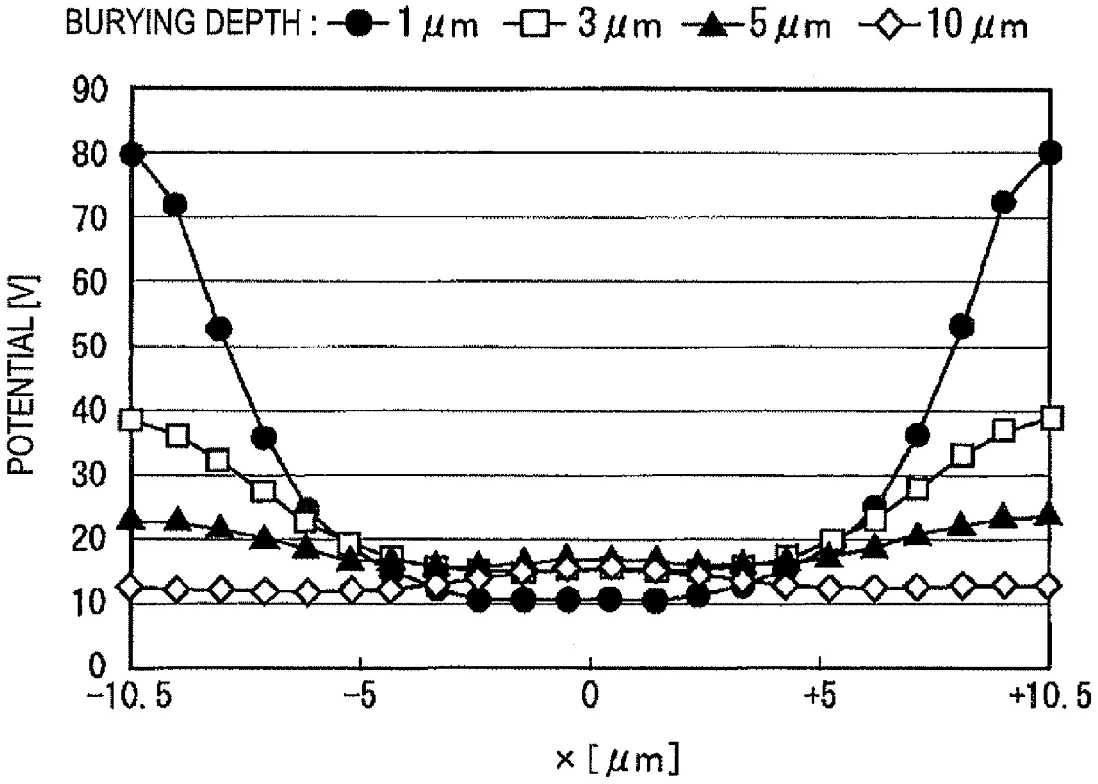
FIG. 20 is a graph to show the result of the example.

As the electric field action, when 100 V was applied to the signal line, surface potential distribution of the same face as the pixel electrode surface between X and X' in FIG. 19A was calculated and the result shown in FIG. 20 was obtained.

When the burying depth of the signal line was 1 μm, the effect of the signal line was acknowledged up to the range largely exceeding the line width of the signal line and it was acknowledged that if the burying depth is further made deep, the effect is lightened.

It was acknowledged that if the burying depth is set to 3 μm, the effect from the signal line is drastically decreased as compared with 1 μm, and it was acknowledged that if the burying depth is set to 5 μm and 10 μm, the effect is gradually decreased.

It was acknowledged that almost constant potential is obtained regardless of the burying depth at a distance of about 5 μm from the end of the signal line.

Thus, the deeper the burying depth of the signal line, the more decreased the effect; this is remarkable at a distance of about 5 μm from the end of the line width of the signal line and it was understood that when the value is exceeded, the effect scarcely appears. Thus, to provide shield electrode, it was understood that the shield electrode may cover the signal line about 10 μm wide on both sides from the line width of the signal line. Thus, it was also understood that preferably a similar shield electrode is provided for the scanning line.

Usually, to manufacture a pixel electrode member, if the layer configuration of signal lines, etc., is made three-dimensional and each signal line is buried just below a pixel electrode, the effect from the signal line in the part lessens, but the effect remains with an exposure portion of the signal line between pixel electrodes (portion where no pixel electrode exists above the signal line) as the center and an image defect of fogging, stripe, dot dirty, etc., occurs. If the signal line is buried deeper, the effect is lightened. However, to manufacture such a pixel electrode member, the production efficiency worsens. Therefore, it is understood that it is advantageous to provide the shield electrode.

Then, the inventors et al. checked the electric field action from the signal line in a pixel electrode member with a shield electrode provided on an upper face less than 1 μm from the signal line, but did not recognize the effect from the signal line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image hold body comprising:

a movable support body;

a plurality of pixel electrodes (i) that is provided on the support body, (ii) that is arranged like a matrix in pixel units along a moving direction of the support body and a crossing direction crossing the move direction, and (iii) to which a latent image voltage is applied based on an image signal;

charge storage members that are provided on the support body in a one-to-one correspondence with the pixel electrodes and that store charge corresponding to the latent image voltage applied to the pixel electrodes;

switch members that are provided on the support body in a one-to-one correspondence with the pixel electrodes and that switch a timing of applying the latent image voltage to the pixel electrodes;

scanning lines that are provided on the support body, and that select and scan a plurality of pixel electrode groups to be scanned through the switch members, the plurality of pixel electrode groups arranged in the crossing direction of the support body;

signal lines that are provided on the support body and that apply the latent image voltage based on the image signal through the switch members to the pixel electrodes of each of the pixel electrode groups selected by the scanning lines in the pixel electrode groups arranged in the move direction of the support body; and shield members that are provided on the support body corresponding to the signal lines placed in the proximity of the pixel electrodes and that shield an effect of at least a part of an electric field from the signal line on an electric field based on the latent image voltage of the pixel electrodes, wherein the shield members are provided so as to shield all of the signal lines positioned between the pixel electrodes.

2. The image hold body according to claim 1, wherein the shield members shield an effect of at least a part of an electric field from the scanning line on the electric field based on the latent image voltage of the pixel electrodes.

3. The image hold body according to claim 1, wherein the shield member is electrically connected to the nearest pixel electrode.

4. The image hold body according to claim 1, wherein the shield members are placed in a deeper position than the pixel electrode relative to a thickness direction of the pixel electrode on the support body.

5. The image hold body according to claim 4, wherein when the pixel electrode is projected in the thickness direction of the pixel electrode, the shield member has a portion overlapping a part of the pixel electrode.

6. An image forming apparatus comprising:

the image hold body according to claim 1;

a latent image write unit that writes a latent image based on an image signal to pixel electrodes of the image hold body; and a developing unit that develops the latent image written by the latent image write unit in a developer.

7. The image forming apparatus according to claim 6, wherein in a mode in which electric connection of the shield member and the pixel electrode is not made, a latent image voltage responsive to a non-image part of the latent image is applied to the shield member.

* * * * *